United States Patent
Kurasawa et al.

(10) Patent No.: US 10,809,846 B2
(45) Date of Patent: Oct. 20, 2020

(54) DISPLAY DEVICE

(71) Applicant: Japan Display Inc., Minato-ku (JP)

(72) Inventors: Hayato Kurasawa, Minato-ku (JP); Hiroshi Mizuhashi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 195 days.

(21) Appl. No.: 15/955,038

(22) Filed: Apr. 17, 2018

(65) Prior Publication Data

US 2018/0300009 A1    Oct. 18, 2018

(30) Foreign Application Priority Data

Apr. 18, 2017    (JP) ................. 2017-081989

(51) Int. Cl.
   *G06F 3/041*    (2006.01)
   *G06F 3/046*    (2006.01)
   (Continued)

(52) U.S. Cl.
   CPC ........ *G06F 3/0416* (2013.01); *G02F 1/13306* (2013.01); *G02F 1/13439* (2013.01);
   (Continued)

(58) Field of Classification Search
   None
   See application file for complete search history.

(56) References Cited

U.S. PATENT DOCUMENTS

2007/0124515 A1    5/2007    Ishikawa et al.
2008/0042985 A1*   2/2008    Katsuhito ............... G06F 3/044
                                                             345/173
(Continued)

FOREIGN PATENT DOCUMENTS

JP    10-49301        2/1998
JP    2005-352572    12/2005
(Continued)

OTHER PUBLICATIONS

Office Action dated Sep. 8, 2020, in Japanese Patent Application No. 2017-081989, filed Apr. 18, 2017, w/English-language Translation.

*Primary Examiner* — Brian M Butcher
(74) *Attorney, Agent, or Firm* — Oblon, McClelland, Maier & Neustadt, L.L.P.

(57) ABSTRACT

A display device includes a substrate, pixel electrodes, a display functional layer, common electrodes, first electrodes, and a controller. The common electrodes and the first electrodes intersect with each other. The controller controls the pixel electrodes, the common electrodes, and the first electrodes in a plurality of display periods to display an image, a first sensing period, and a second sensing period. During the display periods, the pixel electrodes are supplied with a pixel signal, and the common electrodes are supplied with a common signal. During the first sensing period, the common electrodes are supplied with a first drive signal to generate a magnetic field, and an electromotive force caused by the magnetic field is generated in the first electrodes. During the second sensing period, the common electrodes are supplied with a second drive signal to generate electrostatic capacitance between the common electrodes and the first electrodes.

20 Claims, 31 Drawing Sheets

(51) Int. Cl.
*G06F 3/044* (2006.01)
*G02F 1/1343* (2006.01)
*G02F 1/133* (2006.01)
G02F 1/1333 (2006.01)
G02F 1/1335 (2006.01)

(52) U.S. Cl.
CPC ........ *G02F 1/134309* (2013.01); *G06F 3/044* (2013.01); *G06F 3/046* (2013.01); *G06F 3/0412* (2013.01); *G02F 1/13338* (2013.01); *G02F 1/133553* (2013.01); *G02F 2001/133357* (2013.01); *G02F 2201/121* (2013.01); *G02F 2201/123* (2013.01); *G06F 2203/04106* (2013.01)

(56) References Cited

U.S. PATENT DOCUMENTS

| | | | |
|---|---|---|---|
| 2009/0166100 A1* | 7/2009 | Matsubara | G06F 3/046 178/18.06 |
| 2013/0278548 A1* | 10/2013 | Weng | G06F 3/0416 345/174 |
| 2016/0357306 A1* | 12/2016 | Zou | G02F 1/13338 |

FOREIGN PATENT DOCUMENTS

| | | |
|---|---|---|
| JP | 2006-163745 | 6/2006 |
| JP | 2016-206791 A | 12/2016 |

\* cited by examiner

DISPLAY DEVICE

CROSS-REFERENCE TO RELATED APPLICATIONS

This application claims priority from Japanese Application No. 2017-081989, filed on Apr. 18, 2017, the contents of which are incorporated by reference herein in its entirety.

BACKGROUND

1. Technical Field

The present disclosure relates to a display device.

2. Description of the Related Art

In recent years, touch detection devices commonly called touchscreen panels that are capable of detecting an external proximate object have been attracted attention. Such a touchscreen panel is mounted on or integrated with a display device, such as a liquid crystal display device, which is used as a display device with a touch detection function. It is well known that there are touchscreen panels using a capacitance method or an electromagnetic induction method as a detection method for such a display device. In the electromagnetic induction method, coils for generating magnetic fields and coils for detecting the magnetic fields are provided in the display device. An external object to be detected, such as a pen, is provided with a coil and a capacitive element forming a resonant circuit. The pen is detected through electromagnetic induction between the coils in the display device and the coil in the pen. Japanese Patent Application Laid-open Publication No. 10-49301 describes a coordinate input device using the electromagnetic induction method.

The capacitance method greatly differs from the electromagnetic induction method in the configuration of a detection target and detection electrodes. Therefore, if the electrodes and a driving configuration designed for the capacitive touch detection are employed without optimization in the electromagnetic induction method, the electromagnetic induction touch detection may be difficult to be satisfactorily performed.

SUMMARY

According to an aspect, a display device includes: a substrate; a plurality of pixel electrodes; a display functional layer; a plurality of common electrodes; a plurality of first electrodes; and a controller configured to control the pixel electrodes, the common electrodes, and the first electrodes. The substrate, the pixel electrodes, the display functional layer, the common electrodes, and the first electrodes are stacked in this order, and the common electrodes and the first electrodes are provided so as to intersect with each other in a plan view. The controller is configured to perform processing during a plurality of display periods to display an image, during a first sensing period, and during a second sensing period in a time-division manner, and control the pixel electrodes, the common electrodes, and the first electrodes according to the periods. During the display periods, in response to a control signal from the controller, the pixel electrodes are supplied with a pixel signal, and the common electrodes are supplied with a common signal. During the first sensing period, in response to the control signal from the controller, the common electrodes are supplied with a first drive signal to generate a magnetic field, and an electromotive force caused by the magnetic field is generated in the first electrodes. During the second sensing period, in response to the control signal from the controller, the common electrodes are supplied with a second drive signal to generate electrostatic capacitance between the common electrodes and the first electrodes.

DETAILED DESCRIPTION

Figure 1:
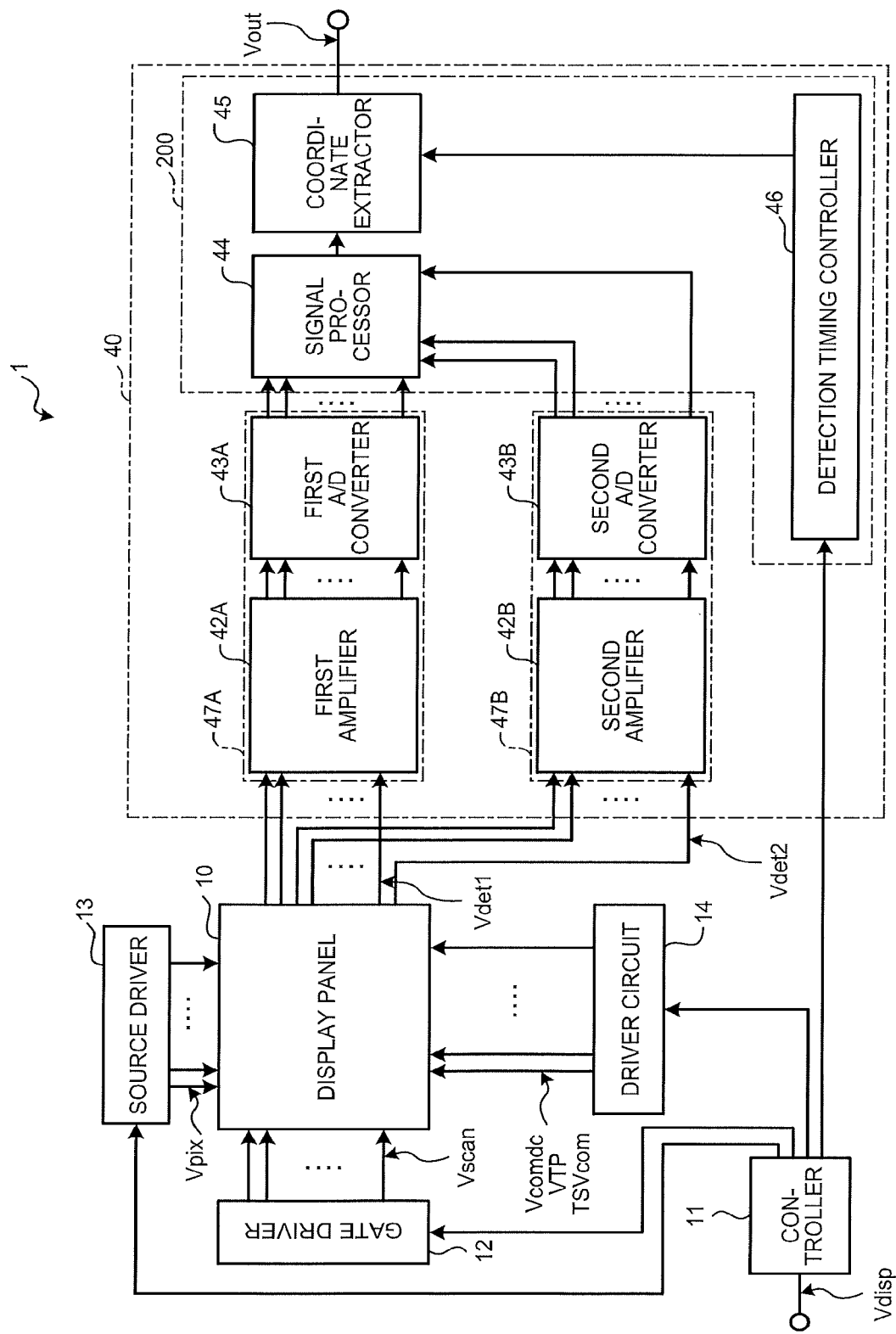
FIG. 1 is a block diagram illustrating a configuration example of a display device according to a first embodiment of the present disclosure.

The following describes embodiments for carrying out the present disclosure in detail with reference to the drawings. The present disclosure is not limited to the description of the embodiments given below. Components described below include those easily conceivable by those skilled in the art or those substantially identical thereto. Moreover, the components described below can be appropriately combined. The disclosure is merely an example, and the present disclosure naturally encompasses appropriate modifications easily conceivable by those skilled in the art while maintaining the gist of the present disclosure. To further clarify the description, widths, thicknesses, shapes, and other properties of various parts are schematically illustrated as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

FIG. 1 is a block diagram illustrating a configuration example of a display device according to a first embodiment of the present disclosure. A display device 1 of the present embodiment incorporates a detection function to detect contact or proximity of a detection target body with or to a display surface. As illustrated in FIG. 1, the display device 1 includes a display panel 10, a controller 11, a gate driver 12, a source driver 13, a driver circuit 14, and a detector 40.

The display panel 10 includes a plurality of pixels including display elements. The display panel 10 has a display surface facing the pixels. The display panel 10 receives a video signal and displays an image formed by the pixels on the display surface.

The controller 11 is a circuit that controls mainly display operations by supplying control signals to the gate driver 12, the source driver 13, and the driver circuit 14 based on an externally supplied video signal Vdisp.

The gate driver 12 has a function to sequentially select one horizontal line as a target of display driving of the display panel 10 based on a control signal supplied from the controller 11.

The source driver 13 is a circuit that supplies a pixel signal Vpix to each sub-pixel SPix of the display panel 10 based on the control signal supplied from the controller 11. The present disclosure is, however, not limited to this configuration. The controller 11 may generate the pixel signal Vpix and supply the pixel signal Vpix to the source driver 13.

The driver circuit 14 supplies a drive signal Vcomdc for display, and a first drive signal VTP and a second drive signal TSVcom for detection, to common electrodes COML (refer to FIG. 7) based on the control signal supplied from the controller 11.

The controller 11 controls a detection operation to detect a detection target body such as a finger or a touch pen of a user (hereinafter, simply called the detection target body) on or above the display panel 10. The display panel 10 has a function to detect a position of a finger in contact with or in proximity to the display surface of the display panel 10 based on the basic principle of touch detection using a mutual-capacitive touch detection method. The display panel 10 also has a function to detect a position of a touch pen in contact with or in proximity to the display surface based on the basic principle of touch detection using an electromagnetic induction method.

When the contact or the proximity of the touch pen is detected using the electromagnetic induction method, the display panel 10 outputs a first detection signal Vdet1 to the detector 40. When the contact or the proximity of the finger is detected using the mutual-capacitance method, the display panel 10 outputs a second detection signal Vdet2 to the detector 40.

During the electromagnetic induction touch detection, the detector 40 detects whether the display surface of the display panel 10 is touched by the touch pen based on a control signal supplied from the controller 11 and the first detection signal Vdet1 output from the display panel 10. During the mutual-capacitive touch detection, the detector 40 detects whether the display surface is touched by the finger based on the control signal supplied from the controller 11 and the second detection signal Vdet2 output from the display panel 10. If the display surface is touched, the detector 40 obtains, for example, coordinates where the touch input is performed.

As illustrated in FIG. 1, the detector 40 includes a first analog front-end circuit 47A (hereinafter, referred to as the first AFE 47A), a second analog front-end circuit 47B (hereinafter, referred to as the second AFE 47B), a signal processor 44, a coordinate extractor 45, and a detection timing controller 46.

The first AFE 47A includes a first amplifier 42A and a first analog-to-digital (A/D) converter 43A. The second AFE 47B includes a second amplifier 42B and a second A/D converter 43B. The first amplifier 42A amplifies the first detection signal Vdet1 supplied from the display panel 10. The second amplifier 42B amplifies the second detection signal Vdet2 supplied from the display panel 10. The first A/D converter 43A samples analog signals output from the first amplifier 42A and converts them into digital signals at times synchronized with the first drive signal VTP. The second A/D converter 43B samples analog signals output from the second amplifier 42B and converts them into digital signals at times synchronized with the second drive signal TSVcom. The first AFE 47A is an analog signal processing circuit that converts the first detection signal Vdet1 into a digital signal, and outputs it to the signal processor 44. The second AFE 47B is an analog signal processing circuit that converts the second detection signal Vdet2 into a digital signal, and outputs it to the signal processor 44.

The signal processor 44 is a logic circuit that detects whether the display panel 10 is touched, based on the output signals from the first AFE 47A and the second AFE 47B. The signal processor 44 performs processing of extracting a signal of difference (absolute value |ΔV|) in the detection signals caused by the detection target body. The signal processor 44 compares the absolute value |ΔV| with a predetermined threshold voltage. If the absolute value |ΔV| is lower than the threshold voltage, the signal processor 44 determines that the detection target body is in a non-contact state. If, instead, the absolute value |ΔV| is equal to or higher than the threshold voltage, the signal processor 44 determines that the detection target body is in a contact state or a proximate state. In this manner, the detector 40 can perform the touch detection.

In this specification, the term "contact state" includes a state where the detection target body is in contact with the display surface and a state where the detection target body is so proximate to the display surface as to be treatable as in contact therewith, and the term "non-contact state" includes a state where the detection target body is not in contact with the display surface and a state where the detection target body is not so proximate to the display surface as to be treatable as in contact therewith.

The coordinate extractor 45 is a logic circuit that obtains touchscreen panel coordinates of the touch when the touch is detected by the signal processor 44. The coordinate extractor 45 outputs the touchscreen panel coordinates as an output signal Vout. The coordinate extractor 45 may output the output signal Vout to the controller 11. The controller 11 can perform a predetermined operation of display or detection based on the output signal Vout.

The detection timing controller 46 controls, based on the control signal supplied from the controller 11, the first and second AFEs 47A and 47B, the signal processor 44, and the coordinate extractor 45 so as to operate them in synchronization with one another.

The first and second AFEs 47A and 47B, the signal processor 44, the coordinate extractor 45, and the detection timing controller 46 of the detector 40 are mounted on the display device 1. The present disclosure is, however, not limited to this configuration. All or some of the functions of the detector 40 may be incorporated in an external processor or the like. For example, the signal processor 44 and the coordinate extractor 45 may be incorporated in an external controller 200 separate from the display device 1.

Figure 2:
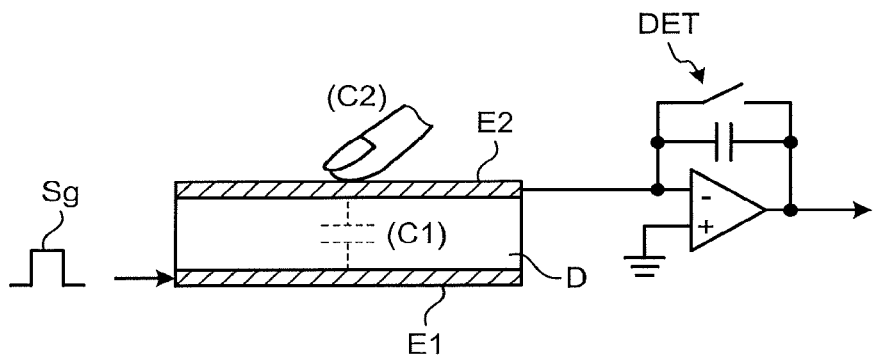
FIG. 2 is an explanatory diagram for explaining the basic principle of mutual-capacitive touch detection.

The display panel 10 performs touch control based on the basic principle of the capacitive touch detection and touch control based on the basic principle of the electromagnetic induction touch detection. The following describes the basic principle of the touch detection using the mutual-capacitive touch detection method performed by the display panel 10 of the present embodiment, with reference to FIG. 2. FIG. 2 is an explanatory diagram for explaining the basic principle of the mutual-capacitive touch detection. FIG. 2 illustrates also a detection circuit. Although the following describes a case where the finger serving as the detection target body is in contact with or in proximity to the display surface, the detection target body is not limited to the finger, but may be an object including a conductor, such as a stylus pen.

For example, as illustrated in FIG. 2, a capacitive element C1 includes a pair of electrodes, that is, a drive electrode E1 and a detection electrode E2 that are disposed opposite to each other with a dielectric material D interposed therebetween. The capacitive element C1 generates lines of electric force between opposite surfaces of the drive electrode E1 and the detection electrode E2, and in addition, generates fringe components of the lines of electric force extending from ends of the drive electrode E1 toward the upper surface of the detection electrode E2. One end of the capacitive element C1 is coupled to an alternating-current signal source, and the other end thereof is coupled to a voltage detector DET. The voltage detector DET is included, for example, in the detector 40 illustrated in FIG. 1.

A square wave Sg having a predetermined frequency (ranging, for example, roughly from several kilohertz to several hundred kilohertz) is applied from the alternating-current signal source to the drive electrode E1 (one end of the capacitive element C1). A current corresponding to the capacitance value of the capacitive element C1 flows in the voltage detector DET. The voltage detector DET converts variation in current corresponding to the square wave Sg into variation in voltage.

In the contact state, electrostatic capacitance C2 generated by the finger is in contact with the detection electrode E2 or is so proximate thereto as to be treatable as in contact therewith, as illustrated in FIG. 2. This condition causes the conductor (finger) to interrupt the fringe components of the lines of electric force present between the drive electrode E1 and the detection electrode E2. This interruption causes the capacitive element C1 to act as a capacitive element having a smaller capacitance value than that in the non-contact state.

The amplitude of the voltage signal output from the voltage detector DET is smaller in the contact state than that in the non-contact state. The absolute value |ΔV| of the difference in the voltage signal varies depending on whether the detection target body is present. The detector 40 compares the absolute value |ΔV| with the predetermined threshold voltage to determine whether the detection target body is in the non-contact state, or in either the contact state or the proximate state.

Figure 3:
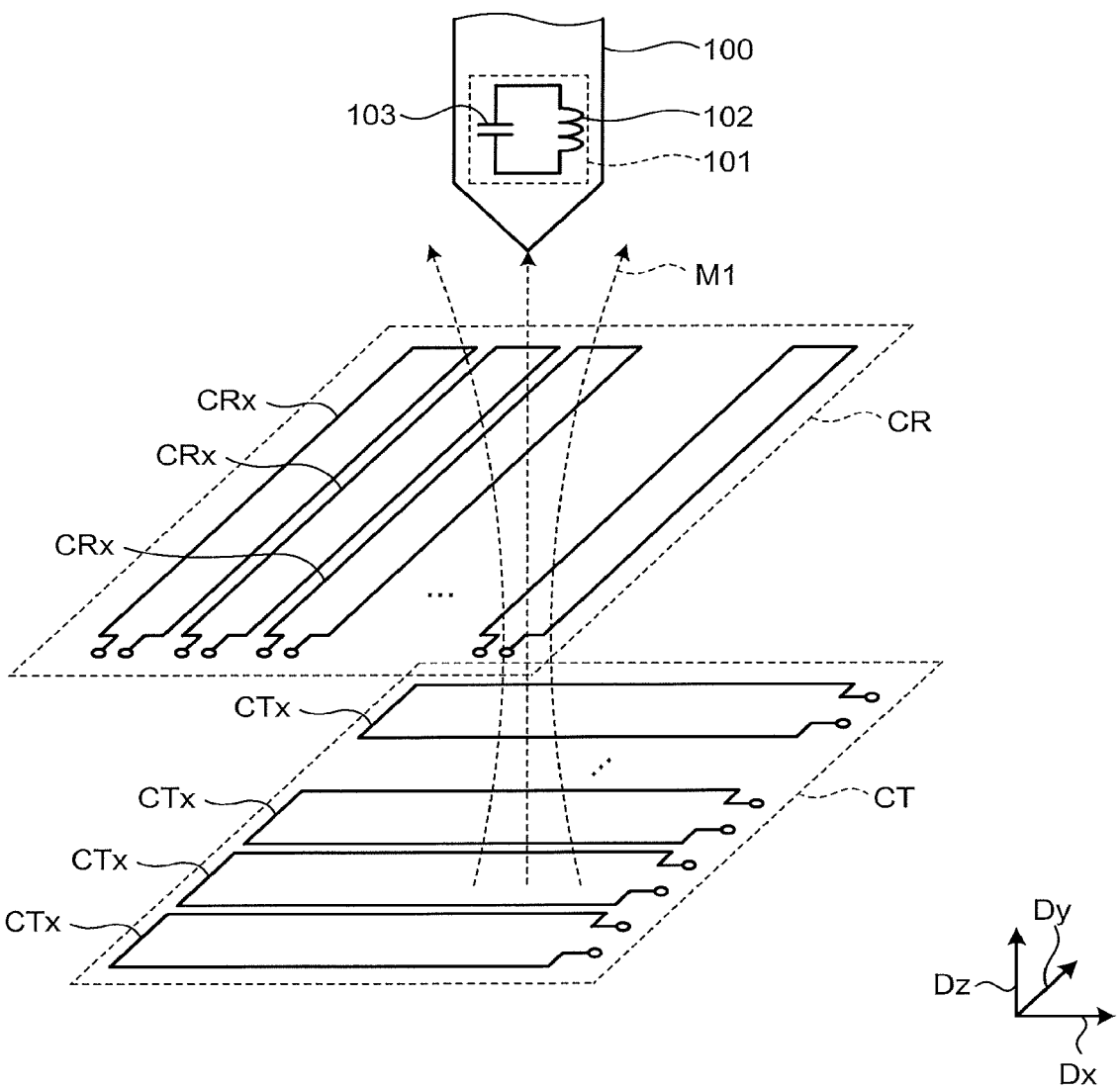
FIG. 3 is an explanatory diagram of a magnetic field generation period for explaining the basic principle of electromagnetic induction touch detection.
Figure 4:
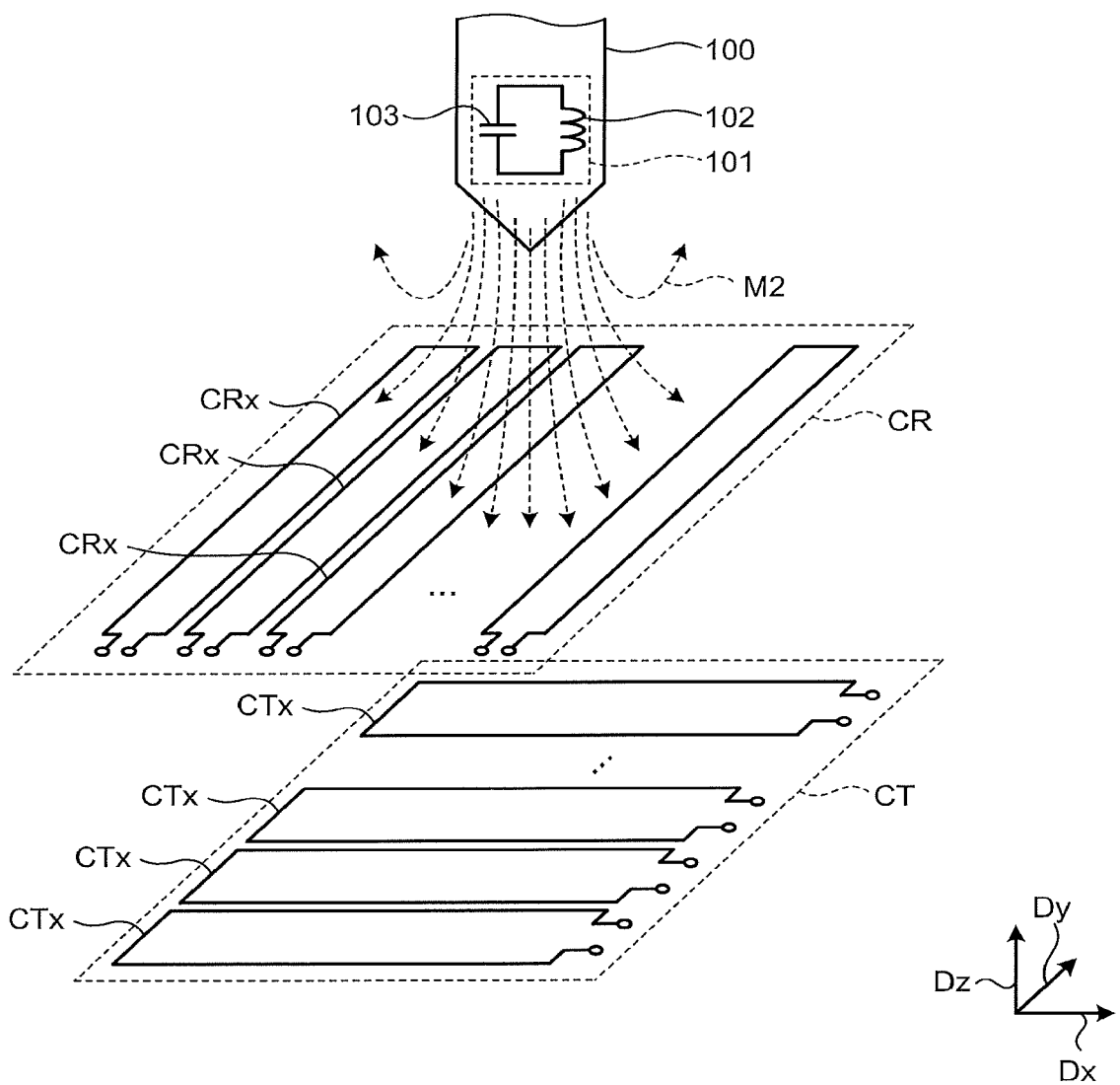
FIG. 4 is an explanatory diagram of a magnetic field detection period for explaining the basic principle of the electromagnetic induction touch detection.

The following describes the basic principle of the touch detection using the electromagnetic induction method performed by the display panel 10 of the present embodiment, with reference to FIGS. 3 and 4. FIG. 3 is an explanatory diagram of a magnetic field generation period for explaining the basic principle of the electromagnetic induction touch detection. FIG. 4 is an explanatory diagram of a magnetic field detection period for explaining the basic principle of the electromagnetic induction touch detection.

As illustrated in FIGS. 3 and 4, in the electromagnetic induction touch detection, the contact or the proximity of a touch pen 100 is detected. A resonant circuit 101 is provided in the touch pen 100. The resonant circuit 101 is configured by coupling a coil 102 to a capacitive element 103 in parallel.

In the electromagnetic induction method, transmitting coils CT and receiving coils CR are provided so as to overlap with each other. A longitudinal direction of each transmitting coil CTx corresponds to a first direction Dx. A longitudinal direction of each receiving coil CRx corresponds to a second direction Dy. The receiving coils CRx are provided so as to intersect with the transmitting coils CTx in a plan view. The transmitting coil CTx is coupled to the alternating-current signal source (drive signal source). The receiving coil CRx is coupled to the voltage detector DET (refer to FIG. 2).

As illustrated in FIG. 3, during the magnetic field generation period, a square wave having a predetermined frequency (ranging, for example, roughly from several kilohertz to several hundred kilohertz) is applied from an alternating-current signal source S to the transmitting coil CTx. As a result, a current flows in the transmitting coil CTx, and the transmitting coil CTx generates a magnetic field M1 corresponding to the change in current. When the touch pen 100 is in contact with or in proximity to the display surface, an electromotive force is generated in the coil 102 by mutual induction between the transmitting coil CTx and the coil 102, whereby the capacitive element 103 is charged.

Then, during the magnetic field detection period illustrated in FIG. 4, the coil 102 of the touch pen 100 generates a magnetic field M2 that varies with the resonant frequency of the resonant circuit 101. The magnetic field M2 passes through the receiving coil CRx, and as a result, an electromotive force is generated in the receiving coil CRx by mutual induction between the receiving coil CRx and the coil 102. A current corresponding to the electromotive force of the receiving coils CRx flows in the voltage detector DET. The touch pen 100 is detected by scanning the transmitting coils CTx and the receiving coils CRx.

Figure 5:
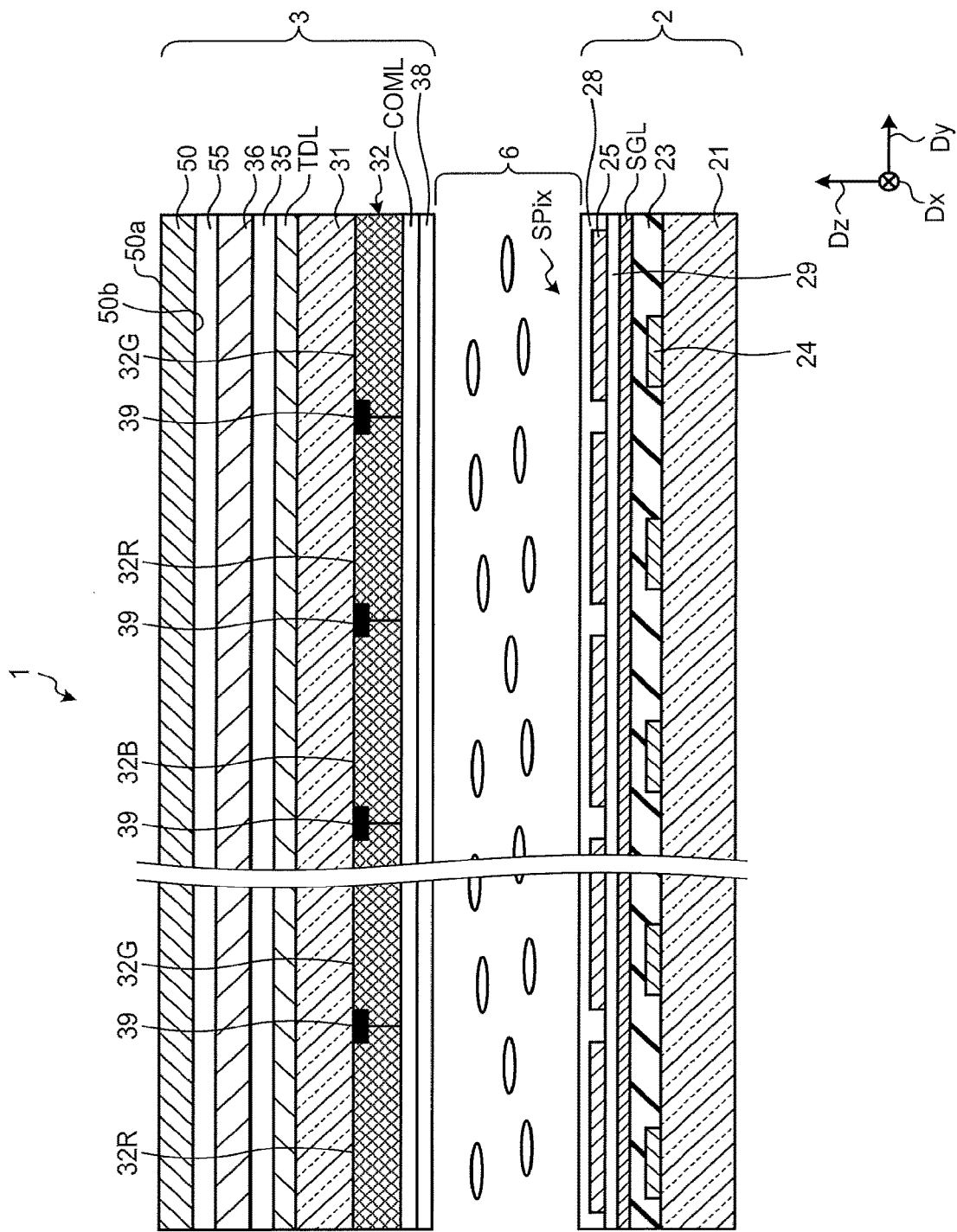
FIG. 5 is a schematic diagram illustrating a sectional structure of the display device according to the first embodiment.

The following describes a configuration example of the display device 1 of the present embodiment. FIG. 5 is a schematic diagram illustrating a sectional structure of the display device according to the first embodiment. As illustrated in FIG. 5, the display device 1 includes a pixel substrate 2, a counter substrate 3, a liquid crystal layer 6 serving as a display functional layer, and a cover member 50. The counter substrate 3 is disposed so as to be opposed to a surface of the pixel substrate 2 in the vertical direction. The liquid crystal layer 6 is provided between the pixel substrate 2 and the counter substrate 3.

The cover member 50 is provided on a surface of the counter substrate 3. A first surface 50a of the cover member 50 is the display surface on which an image is displayed, and is a detection surface to which the detection target body comes in contact or proximity. In the present embodiment, the touch detection includes a case of detecting the detection target body directly in contact with the first surface 50a. The touch detection also includes a case where the first surface 50a is provided thereon with a protective film (not illustrated), and the detection target body in contact with the protective film is detected. The cover member 50 is bonded to a polarizing plate 36 with an adhesive layer 55 interposed therebetween. The cover member 50 may be a glass substrate or may be a film-like base material using a light-transmitting resin material or other materials. Light (external light) incident from outside on the first surface 50a side is reflected by pixel electrodes 25 in the pixel substrate 2 and is transmitted from the first surface 50a. The display device 1 of the present embodiment is a reflective liquid crystal display device that displays the image using this reflected light.

In this specification, the first direction Dx refers to a direction parallel to the first surface 50a, and the second direction Dy refers to a direction intersecting with the first direction Dx in a plane parallel to the first surface 50a. A third direction Dz refers to a direction orthogonal to the first surface 50a. In this specification, in a direction orthogonal to a first substrate 21, the term "upper side" refers to a direction from the first substrate 21 toward a second substrate 31, and the term "lower side" refers to a direction from the second substrate 31 toward the first substrate 21. The term "plan view" refers to a case of viewing from a direction orthogonal to a surface of the first substrate 21.

The pixel substrate 2 includes the first substrate 21, second electrodes 24, the pixel electrodes 25, signal lines SGL, an insulating layer 23, a planarizing film 29, and an orientation film 28. The second electrodes 24, the signal lines SGL, and the pixel electrodes 25 are provided in this order to the first substrate 21. For example, a glass substrate is used as the first substrate 21. The first substrate 21 is provided with circuit elements and various types of wiring, such as gate lines, which are not illustrated, in addition to the signal lines SGL. The circuit elements include switching elements, such as thin-film transistors (TFTs), and capacitive elements.

The pixel electrodes 25 are provided on the planarizing film 29. The orientation film 28 is provided between the pixel electrodes 25 and the liquid crystal layer 6. The pixel electrodes 25 are made of, for example, a metal, such as aluminum (Al) or silver (Ag). The pixel electrodes 25 may also have a configuration stacked with such a metal material and a light-transmitting conductive material, such as indium tin oxide (ITO). The pixel electrodes 25 are made using a material having good reflectance and are provided as reflective electrodes that diffusively reflect the light incident from outside.

The second electrodes 24 are provided between the first substrate 21 and the pixel electrodes 25 in the direction orthogonal to the surface of the first substrate 21. The second electrodes 24 are provided so as to overlap the pixel electrodes 25 with the insulating layer 23 and the planarizing film 29 in between. This configuration generates retention capacitance 53 (refer to FIG. 6) between the second electrodes 24 and the pixel electrodes 25.

The counter substrate 3 includes the second substrate 31, a color filter 32 provided on one surface of the second substrate 31, the common electrodes COML, an orientation film 38, first electrodes TDL provided on the other surface of the second substrate 31, an insulating layer 35, and the polarizing plate 36. In the present embodiment, the second substrate 31 is, for example, a glass substrate or a resin substrate. The first electrodes TDL serve as the detection electrodes or the receiving coils CRx of the display panel 10.

The color filter 32 is opposed to the liquid crystal layer 6 in the direction orthogonal to the first substrate 21. The color filter 32 may be disposed on the first substrate 21. The color filter 32 includes, for example, three filters having a color region 32R (red), a color region 32G (green), and a color region 32B (blue). The color filter 32 may include a white (W) filter, or may include filters having five or more different colors. A light-shielding layer 39 is provided at boundary portions between the color regions 32R, 32G, and 32B. The light-shielding layer 39 is a colored resin layer or metal layer commonly called a black matrix.

The common electrodes COML are provided on a side of the second substrate 31 opposite to a side thereof facing the first electrodes TDL, and are provided between the color filter 32 and the liquid crystal layer 6 in the direction orthogonal to the first substrate 21. The common electrodes COML are made of a light-transmitting conductive material, such as ITO.

The liquid crystal layer 6 includes, for example, nematic liquid crystals. Changing the level of a voltage between the common electrodes COML and the pixel electrodes 25 causes the liquid crystal layer 6 to modulate light passing through the liquid crystal layer 6 on a per sub-pixel SPix basis.

With the configuration described above, the first substrate 21, the pixel electrodes 25, the liquid crystal layer 6 serving as the display functional layer, the common electrodes COML, and the first electrodes TDL are stacked in this order. The incident light incident from the first surface 50a side of the display device 1 passes through the counter substrate 3 and the liquid crystal layer 6, and reaches the pixel electrodes 25. The incident light is reflected by the pixel electrodes 25. The light reflected by the pixel electrodes 25 passes through the liquid crystal layer 6 to be modulated on a per sub-pixel SPix basis, and is transmitted from the first surface 50a.

Since the display device 1 is a reflective display device that performs display by reflecting the external light, a light source, such as a frontlight or a backlight, is not provided. The display device 1 is, however, not limited to this configuration, and may have a light source, such as the frontlight or the backlight. In this case, the frontlight is provided on the first surface 50a side, or the backlight is provided on the back surface of the pixel substrate 2, that is, on a side of the first substrate 21 opposite to a side thereof facing the liquid crystal layer 6. When the backlight is used, light from the backlight passes between the pixel electrodes 25 to reach the first surface 50a. The light from the backlight serves as auxiliary light.

Figure 6:
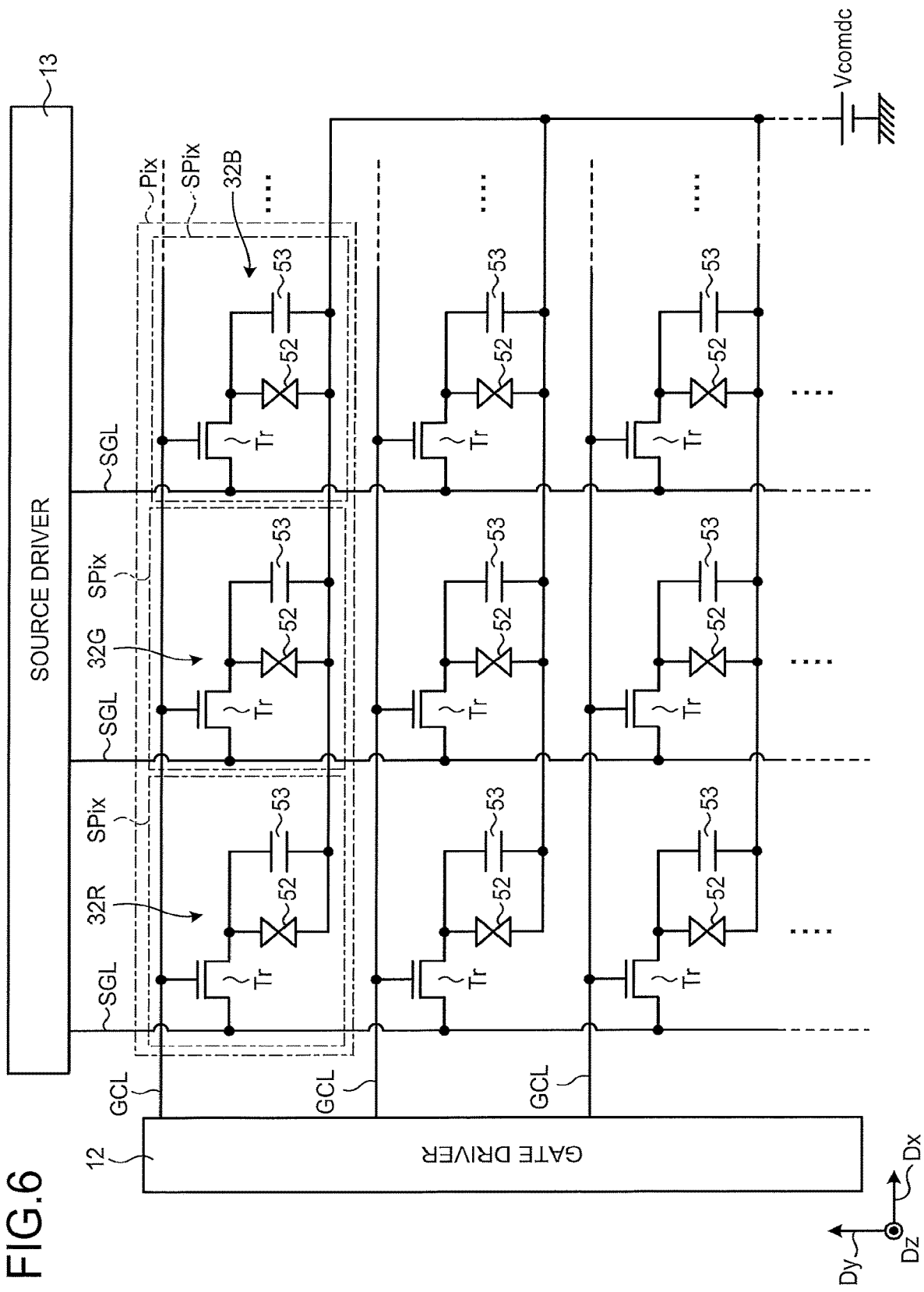
FIG. 6 is a circuit diagram illustrating a pixel array of the display device according to the first embodiment.

The following describes the display operation of the display device 1. FIG. 6 is a circuit diagram illustrating a pixel array of the display device according to the first embodiment. The first substrate 21 illustrated in FIG. 5 is provided with switching elements Tr of the respective sub-pixels SPix and wiring, such as the signal lines SGL for supplying the pixel signals to the respective pixel electrodes 25 and the gate lines GCL for supplying the drive signals for driving the switching elements Tr.

As illustrated in FIG. 6, the display device 1 includes the sub-pixels SPix arranged in a matrix (row-column configuration). Each of the sub-pixels SPix includes the switching element Tr, a liquid crystal element 52, and the retention capacitance 53. Each of the switching elements Tr is fabricated from a thin-film transistor (TFT), and in the present example, fabricated from an n-channel metal oxide semiconductor (MOS) TFT. Each of the liquid crystal elements 52 includes liquid crystal capacitance generated between the pixel electrode 25 and the common electrode COML. Capacitance generated between the pixel electrode 25 and the second electrode 24 can be used as the retention capacitance 53. The sub-pixel SPix is not limited to this configuration, and may be provided with a capacitive element.

The gate lines GCL are coupled to the gate driver 12. The gate driver 12 sequentially selects the gate lines GCL. The gate driver 12 applies a scan signal Vscan (refer to FIG. 1) to the gate of each of the switching elements Tr through the selected one of the gate lines GCL. This operation sequentially selects one row (one horizontal line) of the sub-pixels SPix as a target of display driving. The signal lines SGL are coupled to the source driver 13. The source driver 13 supplies the pixel signal Vpix to each of the sub-pixels SPix included in the selected one horizontal line through the signal lines SGL. These sub-pixels SPix perform display of each horizontal line according to the supplied pixel signals Vpix.

When this display operation is performed, the driver circuit 14 (refer to FIG. 1) applies the drive signal Vcomdc for display to the common electrodes COML and the second electrodes 24. As a result, the common electrodes COML and the second electrodes 24 serve as common electrodes for the pixel electrodes 25 during the display operation. In the present embodiment, the common electrodes COML and the second electrodes 24 are provided along the gate lines GCL, and intersect with the signal lines SGL. The common electrodes COML and the second electrodes 24 are not limited to this configuration, and may be provided so as to intersect with the gate lines GCL.

The color regions 32R, 32G, and 32B of the three colors correspond to the sub-pixels SPix illustrated in FIG. 6 described above. The combination of the color regions 32R, 32G, and 32B is regarded as a set. The sub-pixels SPix corresponding to the color regions 32R, 32G, and 32B of the three colors R, G, and B as a set constitute a pixel Pix.

Figure 7:
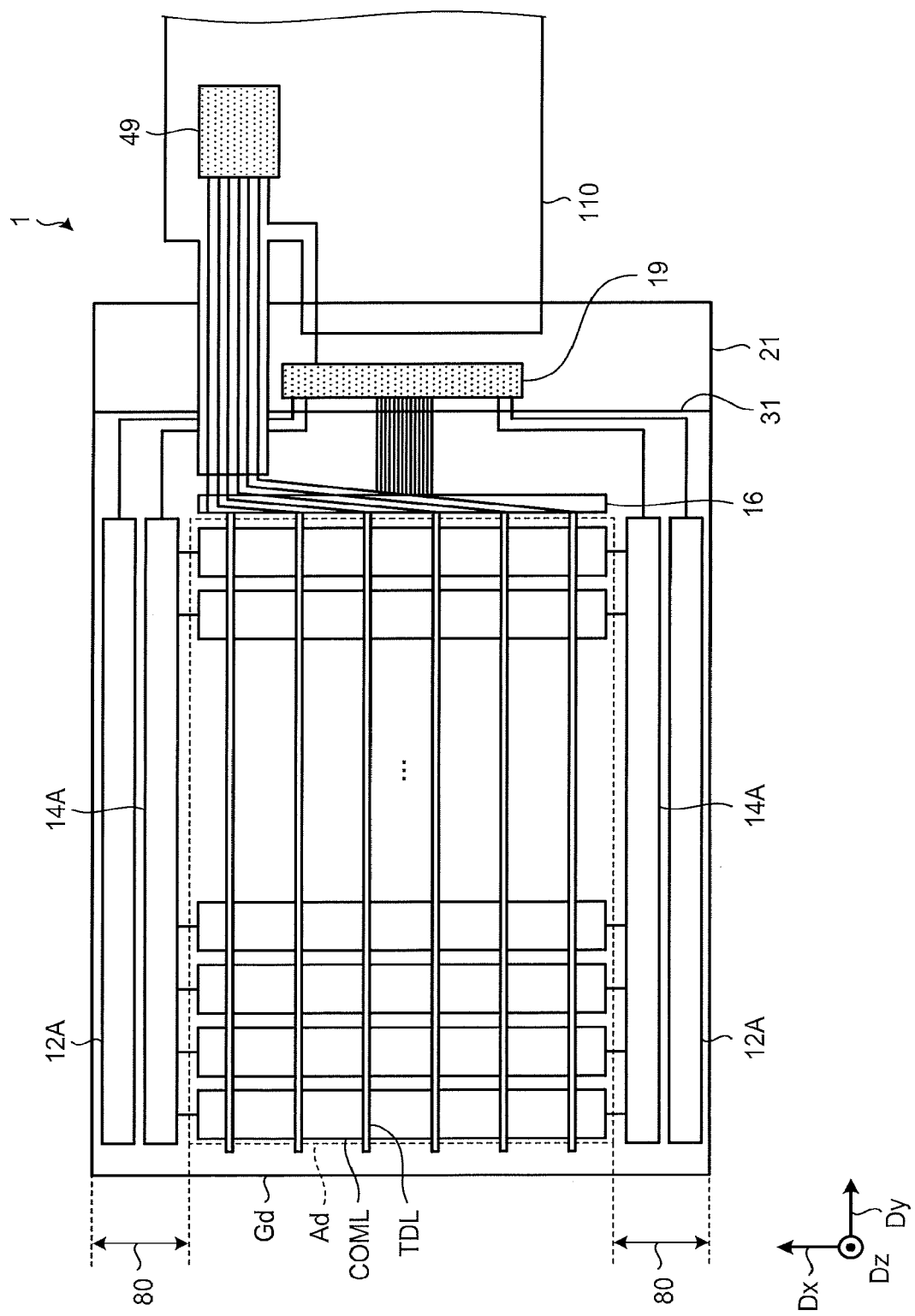
FIG. 7 is a plan view schematically illustrating the display device according to the first embodiment.

The following describes the configuration of the common electrodes COML and the first electrodes TDL, and the touch detection operation. FIG. 7 is a plan view schematically illustrating the display device according to the first embodiment. As illustrated in FIG. 7, the display device 1 is provided with a display region Ad and a peripheral region Gd. In this specification, the display region Ad is a region for displaying the image, and is a region overlapping with the pixels Pix (sub-pixels SPix). In the present embodiment, a direction along a long side of the display region Ad is assumed to be the second direction Dy, and a direction intersecting with the second direction Dy is assumed to be the first direction Dx.

As illustrated in FIG. 7, the common electrodes COML are provided in the display region Ad. The common electrodes COML are provided so as to extend in the first direction Dx, and are arranged in the second direction Dy. The first electrodes TDL are provided in the display region Ad. The first electrodes TDL extend in the second direction Dy and are arranged in the first direction Dx. That is, the first electrodes TDL intersect with the common electrodes COML in the plan view. Both the common electrodes COML and the first electrodes TDL are formed into strips. Electrostatic capacitance is generated at intersecting portions between the common electrodes COML and the first electrodes TDL, and at the peripheries thereof.

The first electrodes TDL are made by forming thin metal wires having a width of several micrometers to several tens micrometers into zigzag lines, wavy lines, or a mesh. In the same manner as the common electrodes COML, the first electrodes TDL may be made using a light-transmitting conductive material, such as ITO.

As illustrated in FIG. 7, a flexible substrate 110 is coupled to the first substrate 21 and the second substrate 31 in the peripheral region Gd. The flexible substrate 110 is provided with a touch integrated circuit (IC) 49 for controlling the detection operation of the display panel 10. The first electrodes TDL are each electrically coupled to the touch IC 49. In addition, the first substrate 21 in the peripheral region Gd is provided with a driver IC 19 for controlling the display operation of the display panel 10. The common electrodes COML are each electrically coupled to the driver IC 19. The various circuits, such as the source driver 13 and the driver circuit 14, illustrated in FIG. 1 are provided in the driver IC 19. A multiplexer 16 is provided between the driver IC 19 and the display region Ad. The first and second AFEs 47A and 47B illustrated in FIG. 1 are provided in the touch IC 49.

The long sides of the peripheral region Gd of the first substrate 21 are provided with various circuits, such as a gate scanning circuit 12A and a common electrode scanner 14A. The gate scanning circuit 12A is a circuit included in the gate driver 12 (refer to FIG. 1), and sequentially selects the gate lines GCL. The common electrode scanners 14A are circuits that sequentially or simultaneously select the common electrodes COML. The common electrode scanner 14A is electrically coupled to the common electrodes COML, and supplies various drive signals from the driver IC 19 to the common electrodes COML. A region of the peripheral region Gd provided with the various circuits is a peripheral circuit region 80.

With this configuration, when the mutual-capacitive touch detection is performed, the driver IC 19 supplies the second drive signal TSVcom to the common electrodes COML in a time-division manner. In this case, the common electrode scanner 14A may simultaneously select a drive electrode block Bk (refer to FIG. 10) including a plurality of common electrodes COML, and sequentially supply the second drive signal TSVcom on a per drive electrode block Bk basis. The second detection signal Vdet2 corresponding to a change in electrostatic capacitance between the common electrodes COML and the first electrodes TDL is output from the first electrodes TDL to the touch IC 49, and thus, the touch of the detection target body is detected. That is, each of the common electrodes COML corresponds to the drive electrode E1, and each of the first electrodes TDL corresponds to the detection electrode E2, in the basic principle of the mutual-capacitive touch detection described above.

Figure 8:
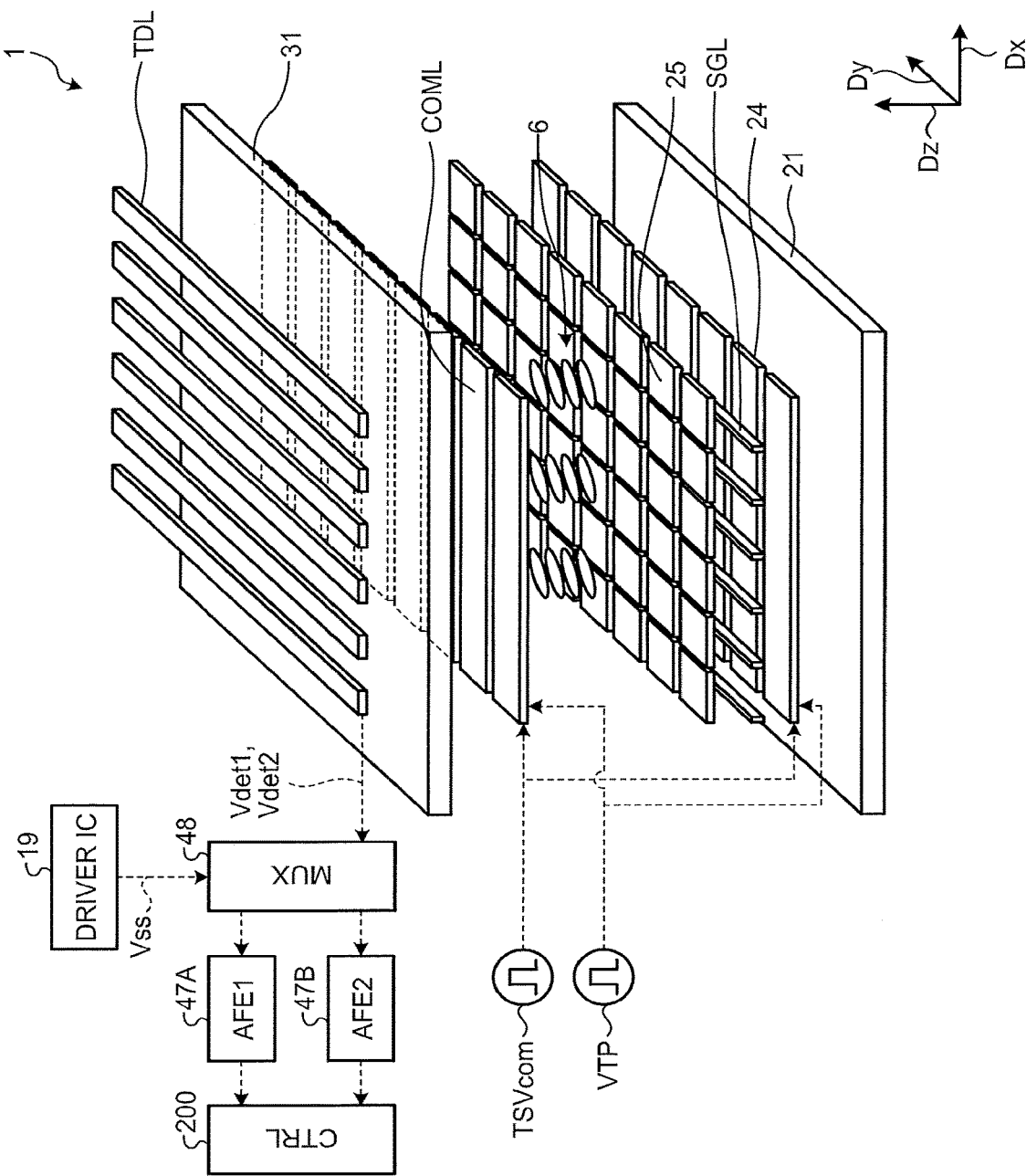
FIG. 8 is an exploded perspective view of the display device according to the first embodiment.

The following describes the electromagnetic induction touch detection. FIG. 8 is an exploded perspective view of the display device according to the first embodiment. As illustrated in FIG. 8, the second electrodes 24 are provided so as to extend in the first direction Dx, and are arranged in the second direction Dy. The second electrodes 24 are provided so as to overlap with the common electrodes COML in the plan view. Each of the second electrodes 24 has a strip shape, and a longitudinal direction of the second electrode 24 is the same direction as that of the common electrodes COML. The signal lines SGL are disposed between the first substrate 21 and the liquid crystal layer 6. The signal lines SGL extend in the second direction Dy and are arranged in the first direction Dx. Each of the common electrodes COML and each of the second electrodes 24 intersect with the signal lines SGL in the plan view.

The first and second AFEs 47A and 47B are electrically coupled to the first electrodes TDL through a multiplexer 48. The driver IC 19 supplies a switching signal Vss to the multiplexer 48. The multiplexer 48 is a circuit that changes the coupling state between the first electrodes TDL and the first and second AFEs 47A and 47B based on the switching signal Vss. The multiplexer 48 couples the first electrodes TDL to the first AFE 47A when the electromagnetic induction method is used, and couples the first electrodes TDL to the second AFE 47B when the mutual-capacitance method is used. The multiplexer 48 may be provided on the second substrate 31 or provided in the touch IC 49. The output signals from the first and second AFEs 47A and 47B are supplied to the external controller 200. The controller 200 is, for example, a host IC mounted on a control board.

When the electromagnetic induction touch detection is performed, the driver IC 19 supplies the first drive signal VTP to the common electrodes COML. The common electrodes COML serve as the transmitting coils CTx when the electromagnetic induction touch detection is performed. As a result, the electromagnetic induction is generated among the common electrodes COML, the touch pen 100, and the first electrodes TDL. The electromotive force is generated in the first electrodes TDL by the mutual induction with the touch pen 100. The first detection signal Vdet1 corresponding to the electromotive force is supplied from the first electrodes TDL to the first AFE 47A through the multiplexer 48. As a result, the electromagnetic induction touch detection is performed.

In the present embodiment, when the electromagnetic induction touch detection is performed, the driver IC 19 supplies the first drive signal VTP also to the second electrodes 24. When the mutual-capacitive touch detection is performed, the driver IC 19 supplies the second drive signal TSVcom also to the second electrodes 24. That is, in the same manner as the common electrodes COML, the second electrodes 24 serve as drive electrodes in the mutual-capacitance method and serve as the transmitting coils in the electromagnetic induction method. This configuration can improve detection sensitivity in the touch detection using the mutual-capacitance method and the electromagnetic induction method.

Figure 9:
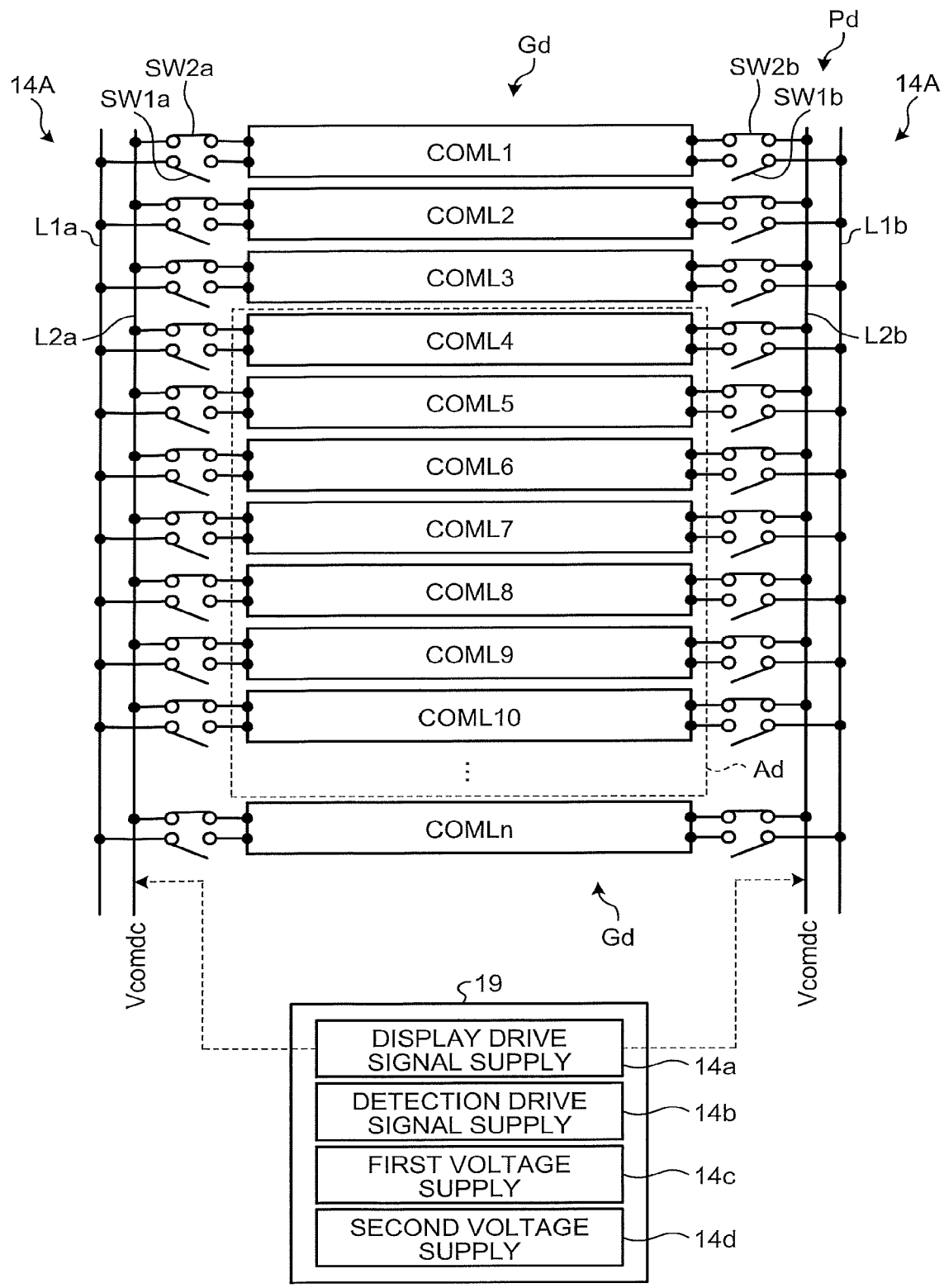
FIG. 9 is a circuit diagram illustrating a coupling configuration of common electrodes during a display period.
Figure 10:
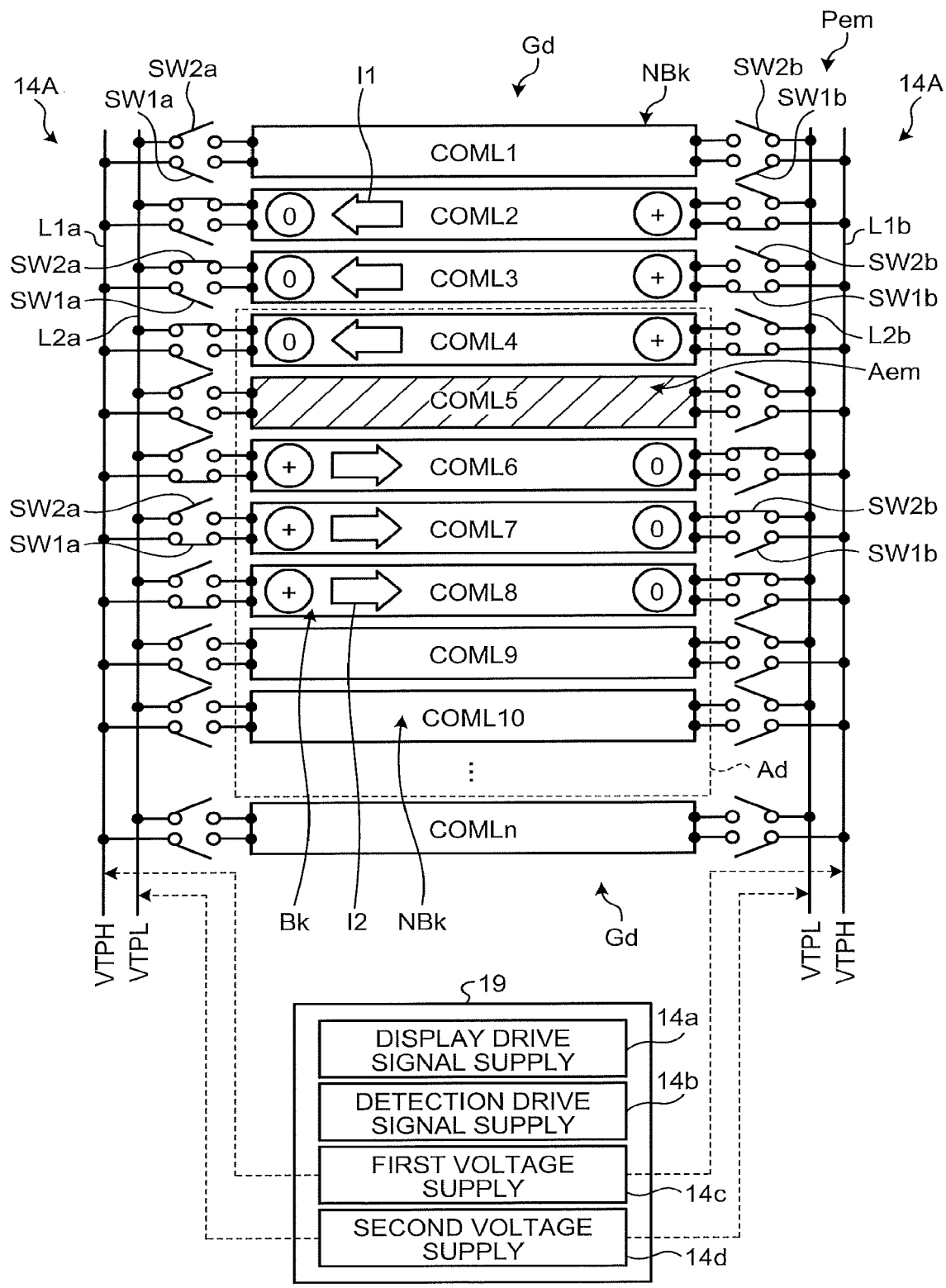
FIG. 10 is a circuit diagram illustrating a coupling configuration of the common electrodes during a first sensing period.
Figure 11:
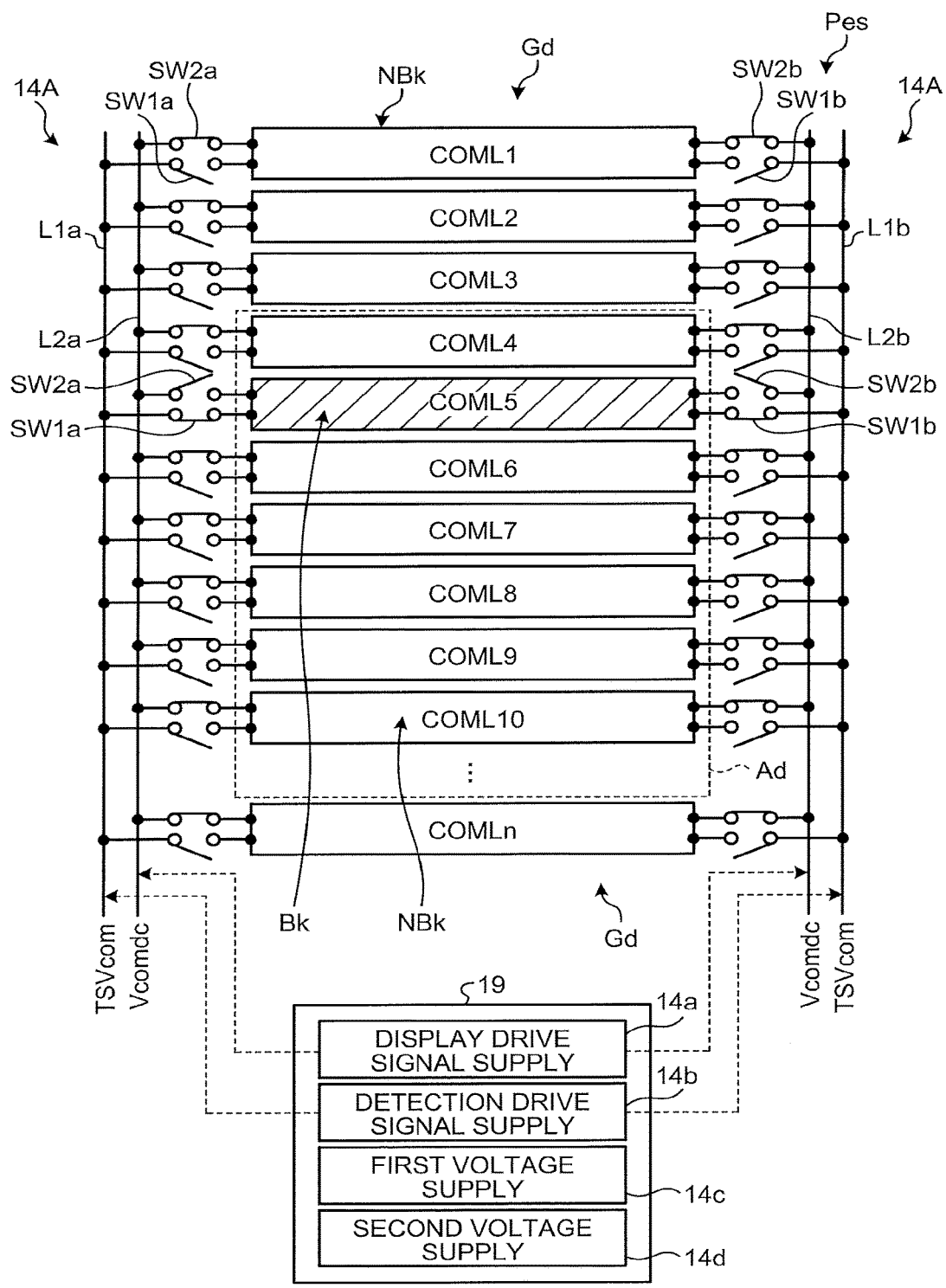
FIG. 11 is a circuit diagram illustrating a coupling configuration of the common electrodes during a second sensing period.

The common electrodes COML have the functions of the common electrodes during the display, the functions of the drive electrodes during the touch detection using the mutual-capacitance method, and the functions of the transmitting coils during the touch detection using the electromagnetic induction method. Therefore, the coupling state needs to be changed according to the operation of each of the functions. The following describes coupling configurations of the common electrodes COML. FIG. 9 is a circuit diagram illustrating a coupling configuration of the common electrodes during a display period. FIG. 10 is a circuit diagram illustrating a coupling configuration of the common electrodes during a first sensing period. FIG. 11 is a circuit diagram illustrating still a coupling configuration of the common electrodes during a second sensing period.

As illustrated in FIGS. 9 to 11, a plurality of common electrodes COML1, COML2, . . . , COMLn are arranged. In the following description, the common electrodes COML1, COML2, . . . , COMLn will each be referred to as a common electrode COML when they need not be distinguished from one another.

The common electrode scanner 14A includes first wiring L1a and L1b, second wiring L2a and L2b, and switches SW1a, SW1b, SW2a, and SW2b. The common electrode scanner 14A is provided on both one end side and the other end side of the common electrodes COML. In the following description, one end of the common electrode COML is referred to as the left end, and the other end thereof is referred to as the right end, with reference to FIGS. 9 to 11. The first wiring L1a and the second wiring L2a are provided on the left end side of the common electrodes COML, and the first wiring L1b and the second wiring L2b are provided on the right end side of the common electrodes COML.

The switch SW1a is provided between the left end of the common electrode COML and the first wiring L1a. The switch SW2a is provided between the left end of the common electrode COML and the second wiring L2a. The switch SW1a and the switch SW2a are coupled in parallel to the left end of each of the common electrodes COML. The switch SW1b is provided between the right end of the common electrode COML and the first wiring L1b. The switch SW2b is provided between the right end of the common electrode COML and the second wiring L2b. The switch SW1b and the switch SW2b are coupled in parallel to the right end of each of the common electrode COMLs.

The driver IC 19 supplies various signals to the common electrodes COML through the first wiring L1a and L1b and the second wiring L2a and L2b. The driver circuit 14 (refer to FIG. 1) includes a display drive signal supply 14a, a detection drive signal supply 14b, a first voltage supply 14c, and a second voltage supply 14d. These supplies are incorporated in the driver IC 19.

The display drive signal supply 14a supplies the drive signal Vcomdc for display to the common electrodes COML through the second wiring L2a and L2b. The detection drive signal supply 14b supplies the second drive signal TSVcom for detection to the common electrodes COML through the first wiring L1a and L1b. The first voltage supply 14c supplies a first voltage VTPH of a direct current having a first potential to the common electrodes COML through the first wiring L1a and L1b. The second voltage supply 14d supplies a second voltage VTPL of a direct current having a second potential lower than the first potential to the common electrodes COML through the second wiring L2a and L2b.

As illustrated in FIG. 9, during a display period Pd in which an image is displayed, all the switches SW1a and SW1b are turned off, and all the switches SW2a and SW2b are turned on, in response to a control signal from the controller 11. As a result, all the common electrodes COML are uncoupled from the first wiring L1a and L1b; the second wiring L2a is coupled to the left ends of all the common electrodes COML; and the second wiring L2b is coupled to the right ends of all the common electrodes COML.

As a result, during the display period Pd, the display drive signal supply 14a supplies the drive signal Vcomdc for display to all the common electrodes COML through the second wiring L2a and L2b. The display drive signal supply 14a is not limited to this operation, and may supply the drive signal Vcomdc in a time-division manner to a common electrode COML overlapping one horizontal line serving as a target of the display driving.

As illustrated in FIG. 10, during a first sensing period Pem in which the electromagnetic induction touch detection is performed, the switches SW1a and SW1b and the switches SW2a and SW2b operate in response to the control signal from the controller 11, and the drive electrode block Bk is selected. Specifically, the common electrodes COML2, COML3, COML4, COML6, COML7, and COML8 are selected as the drive electrode block Bk. The other of the common electrodes COML serve as a non-selected electrode block NBk. A region between the common electrode COML4 and the common electrode COML6 is a detection region Aem that detects the detection target body.

The switches SW1a and SW1b and the switches SW2a and SW2b for the common electrodes COML in the non-selected electrode block NBk are turned off in response to the control signal from the controller 11. This operation brings the common electrodes COML in the non-selected electrode block NBk into a floating state.

On the left side of the common electrodes COML2, COML3, and COML4, the switches SW1a are turned off, and the switches SW2a are turned on. As a result, the left ends of the common electrodes COML2, COML3, and COML4 are electrically coupled to the second wiring L2a. On the right side of the common electrodes COML2, COML3, and COML4, the switches SW1b are turned on, and the switches SW2b are turned off. As a result, the right ends of the common electrodes COML2, COML3, and COML4 are electrically coupled to the first wiring L1b.

On the left side of the common electrodes COML6, COML7, and COML8, the switches SW1a are turned on, and the switches SW2a are turned off. As a result, the left ends of the common electrodes COML6, COML7, and COML8 are electrically coupled to the first wiring L1a. On the right side of the common electrodes COML6, COML7, and COML8, the switches SW1b are turned off, and the switches SW2b are turned on. As a result, the right ends of the common electrodes COML6, COML7, and COML8 are electrically coupled to the second wiring L2b.

As a result, during the first sensing period Pem, in response to the control signal from the controller 11, the first voltage supply 14c is coupled to the left end of at least one common electrode COML (common electrodes COML6, COML7, and COML8), and the second voltage supply 14d is coupled to the right end thereof. In addition, the second voltage supply 14d is coupled to the left end of the common electrodes COML (common electrodes COML2, COML3, and COML4) other than the at least one common electrode, and the first voltage supply 14c is coupled to the right end thereof.

The second voltage supply 14d supplies the second voltage VTPL to the left ends of the common electrodes COML2, COML3, and COML4 through the second wiring L2a. The first voltage supply 14c supplies the first voltage VTPH to the right ends of the common electrodes COML2, COML3, and COML4 through the first wiring L1b. As a result, potential differences between the left ends and the right ends of the common electrodes COML2, COML3, and COML4 are generated, and currents I1 thus flow in a direction from the right ends toward the left ends thereof. Each of the first voltage VTPH and the second voltage VTPL is a direct-current voltage signal. The operations of the switches are switched at a predetermined frequency to generate the first drive signal VTP serving as an alternating-current voltage signal.

The first voltage supply 14c supplies the first voltage VTPH to the left ends of the common electrodes COML6, COML7, and COML8 through the first wiring L1a. The second voltage supply 14d supplies the second voltage VTPL to the right ends of the common electrodes COML6, COML7, and COML8 through the second wiring L2b. As a result, potential differences between the left ends and the right ends of the common electrodes COML6, COML7, and COML8 are generated, and currents I2 thus flow in a direction from the left ends toward the right ends thereof.

In this manner, the first voltage VTPH and the second voltage VTPL supplied to both ends of the common electrodes COML are changed over to each other by switching the operations of the switches SW1a, SW2a, SW1b, and SW2b. As a result, the first drive signal VTP is supplied to the common electrodes COML. The currents I1 and I2 generate magnetic fields.

The currents I1 and the currents I2 flow in directions opposite to each other. As a result, the magnetic field generated by the currents I1 overlaps with the magnetic field generated by the currents I2 in the detection region Aem. The flowing of the currents I1 and the currents I2 in the opposite directions can increase the strength of the magnetic field passing through the detection region Aem. The magnetic field generated by the currents I1 and the currents I2 corresponds to the magnetic field M1 generated during the magnetic field generation period of the electromagnetic induction method illustrated in FIG. 3. The common electrodes COML2, COML3, COML4, COML6, COML7, and COML8 included in the drive electrode block Bk correspond to the transmitting coils CTx.

The controller 11 sequentially selects the common electrodes COML1 to COMLn. As a result, the touch detection is performed over the entire display region Ad using the electromagnetic induction method. As illustrated in FIG. 10, the common electrodes COML1, COML2, COML3, and COMLn are also provided in the peripheral region Gd. This configuration can also generate magnetic fields in the peripheral portion of the display region Ad. In this case, the common electrodes COML1, COML2, COML3, and COMLn are provided in positions not overlapping with the detection region Aem.

The transmitting coils CTx are not limited to the example illustrated in FIG. 10, and may be one or two of the common electrodes COML disposed on one side of the detection region Aem and one or two of the common electrodes COML disposed on the other side of the detection region Aem. The transmitting coils CTx may be four or more of the common electrodes COML disposed on one side of the detection region Aem and four or more of the common electrodes COML disposed on the other side of the detection region Aem. The numbers of the common electrodes COML on both sides of the detection region Aem need not be the same as each other. A configuration can be employed in which the number of the common electrodes COML on one side differs from that of the common electrodes COML on the other side.

As illustrated in FIG. 11, during a second sensing period Pes in which the mutual-capacitive touch detection is performed, the switches SW1a and SW1b coupled to both ends of the common electrodes COML in the drive electrode block Bk are turned on in response to the control signal from the controller 11. In addition, the switches SW2a and SW2b are turned off. As a result, the drive electrode block Bk is selected. For the non-selected electrode block NBk, the switches SW2a and SW2b coupled to both ends of the common electrodes COML are turned on, and the switches SW1a and SW1b are turned off.

The detection drive signal supply 14b supplies the second drive signal TSVcom serving as an alternating-current voltage signal to the common electrodes COML in the drive electrode block Bk through the first wiring L1a and L1b. The display drive signal supply 14a supplies the drive signal Vcomdc serving as a direct-current voltage signal to the common electrodes COML in the non-selected electrode block NBk through the second wiring L2a and L2b. The controller 11 sequentially selects the common electrodes COML provided in the display region Ad. A configuration can also be employed in which the second voltage supply 14d supplies the second voltage VTPL serving as a direct-current voltage signal to the non-selected electrode block NBk during the second sensing period Pes.

Figure 12:
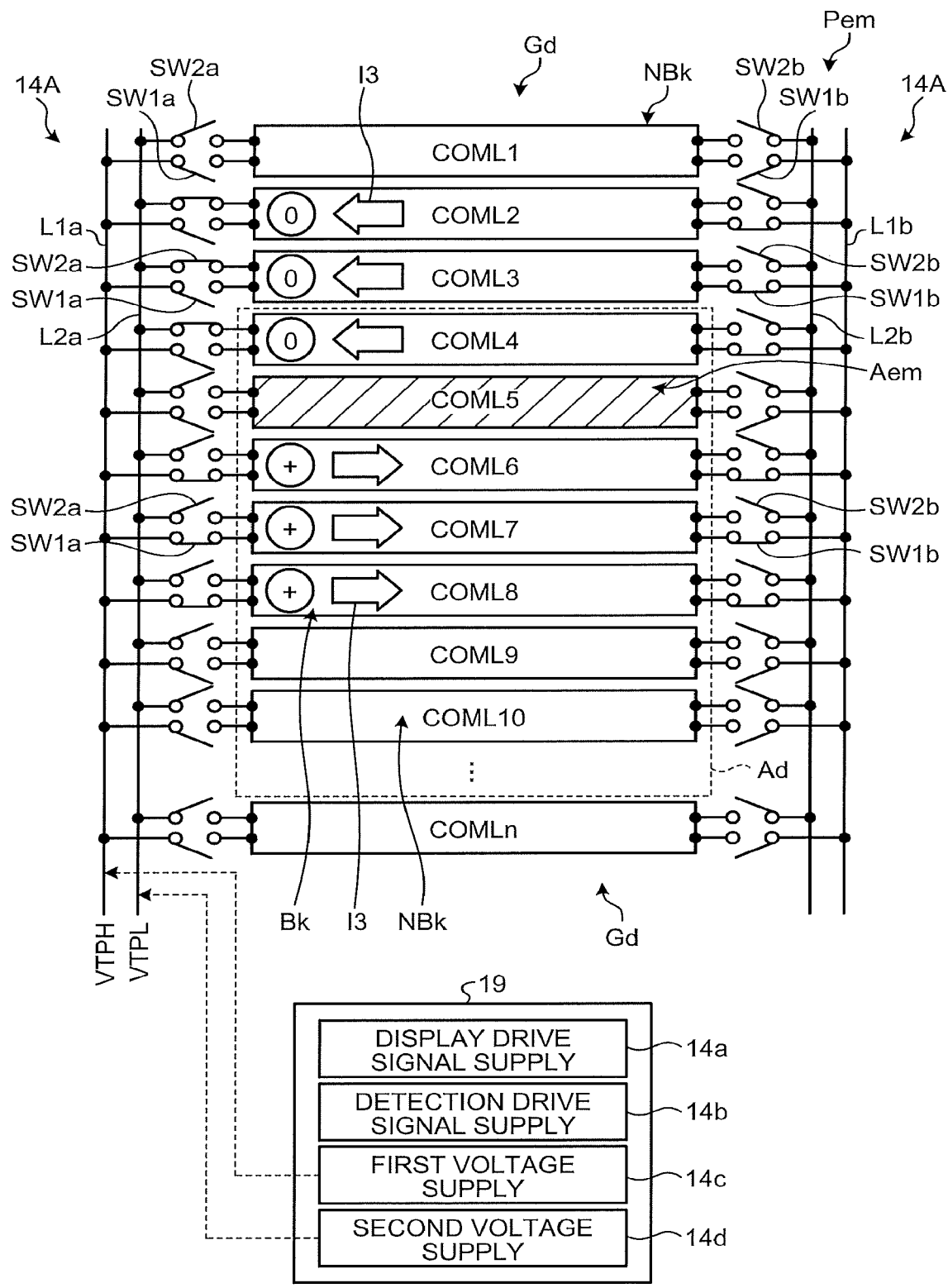
FIG. 12 is a circuit diagram illustrating another example of the coupling configuration of the common electrodes during the first sensing period.

FIG. 12 is a circuit diagram illustrating another example of the coupling configuration of the common electrodes during the first sensing period. As illustrated in FIG. 12, on the right side of the common electrodes COML6, COML7, and COML8, the switches SW1b are turned on, and the switches SW2b are turned off. The operations of the switches SW1a and the switches SW2a on the left side of the common electrodes COML6, COML7, and COML8 are the same as those in the example illustrated in FIG. 10, and the operations of the switches SW1a, SW1b, SW2a, and SW2b coupled to the common electrodes COML2, COML3, and COML4 are the same as those in the example illustrated in FIG. 10.

The supplies 14a to 14d of the driver IC 19 do not supply the various signals to the first wiring L1b and the second wiring L2b disposed on the other end side of the common electrodes COML.

With the configuration described above, the right ends of the common electrodes COML2, COML3, and COML4 are electrically coupled to the right ends of the common electrodes COML6, COML7, and COML8 through the switches SW1b and the first wiring L1b. That is, the common electrodes COML2, COML3, and COML4, the first wiring L1b, and the common electrodes COML6, COML7, and COML8 are coupled together so as to form a loop surrounding the detection region Aem.

The first voltage supply 14c supplies the first voltage VTPH to the left ends of the common electrodes COML6, COML7, and COML8 through the first wiring L1a. The second voltage supply 14d supplies the second voltage VTPL to the left ends of the common electrodes COML2, COML3, and COML4 through the second wiring L2a. As a result, currents I3 flow from the common electrodes COML2, COML3, and COML4 to the common electrodes COML6, COML7, and COML8. The currents I3 generate a magnetic field passing through the detection region Aem.

In this manner, the switches SW1b are provided that couple together the ends on the same side of a pair of groups of common electrodes (the common electrodes COML2, COML3, and COML4 and the common electrodes COML6, COML7, and COML8) among the common electrodes COML. During the first sensing period Pem, the controller 11 couples together a pair of groups of common electrodes COML by operating the switches SW1b and SW2b. During a period different from the first sensing period Pem, that is, for example, during the display period Pd, the controller 11 uncouples the pair of groups of common electrodes COML from each other by operating the switches SW1b and SW2b.

Also with the configuration described above, the common electrodes COML constitute the transmitting coils CTx during the first sensing period Pem. The direction of the currents I3 flowing in the common electrodes COML2, COML3, and COML4 is opposite to the direction of the currents I3 flowing in the common electrodes COML6, COML7, and COML8. This configuration can increase the strength of the magnetic field passing through the detection region Aem. Accordingly, the detection sensitivity of the electromagnetic induction method can be increased.

Figure 13:
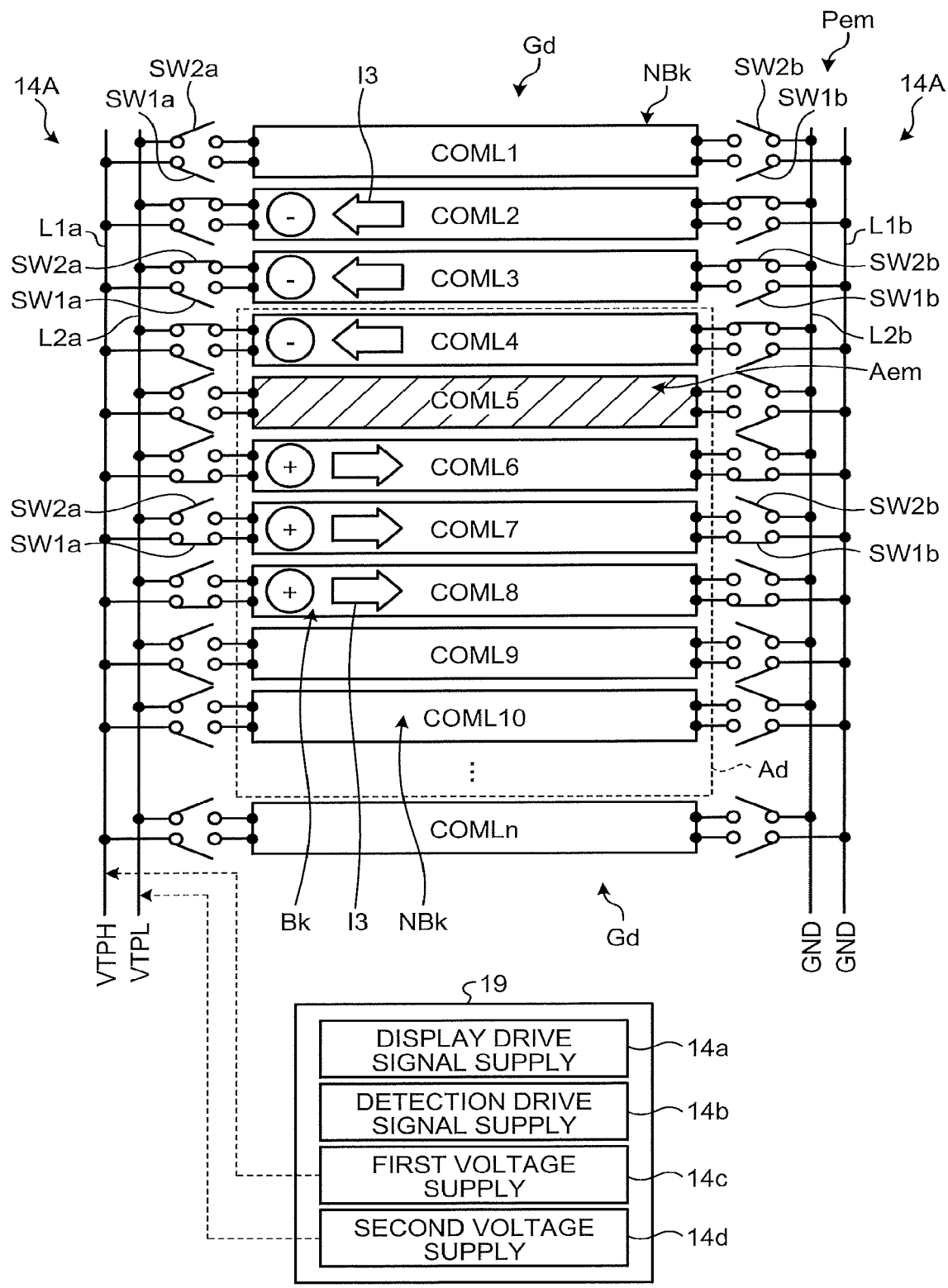
FIG. 13 is a circuit diagram illustrating still another example of the coupling configuration of the common electrodes during the first sensing period.

FIG. 13 is a circuit diagram illustrating still another example of the coupling configuration of the common electrodes during the first sensing period. In this modification, on the right side of the common electrodes COML, the first wiring L1b and the second wiring L2b are supplied with ground potential GND. The right ends of the common electrodes COML2, COML3, and COML4 are coupled to the second wiring L2b through the switches SW2b. The operations of the switches on the left sides of the common electrodes COML2, COML3, and COML4 and the common electrodes COML6, COML7, and COML8 are the same as those of the example illustrated in FIG. 12.

The first voltage supply 14c supplies the first voltage VTPH to the left ends of the common electrodes COML6, COML7, and COML8 through the first wiring L1a. A potential difference between the first voltage VTPH and the ground potential GND causes the currents I3 to flow from the left ends toward the right ends of the common electrodes COML6, COML7, and COML8. The second voltage supply 14d supplies the second voltage VTPL to the left ends of the common electrodes COML2, COML3, and COML4 through the second wiring L2a. In the examples illustrated in FIGS.

10 and 12, the second voltage VTPL has substantially the same potential as that of the ground potential GND. In contrast, in the present modification, the second voltage VTPL has a lower potential than the ground potential GND. In this manner, the second voltage supply 14d can supply the second voltage VTPL having a negative potential. As illustrated in FIG. 13, a potential difference between the second voltage VTPL and the ground potential GND causes the currents I3 to flow from the right ends toward the left ends of the common electrodes COML2, COML3, and COML4. The currents I3 generate a magnetic field passing through the detection region Aem. Also with the configuration described above, the common electrodes COML constitute the transmitting coils CTx during the first sensing period Pem.

Figure 14:
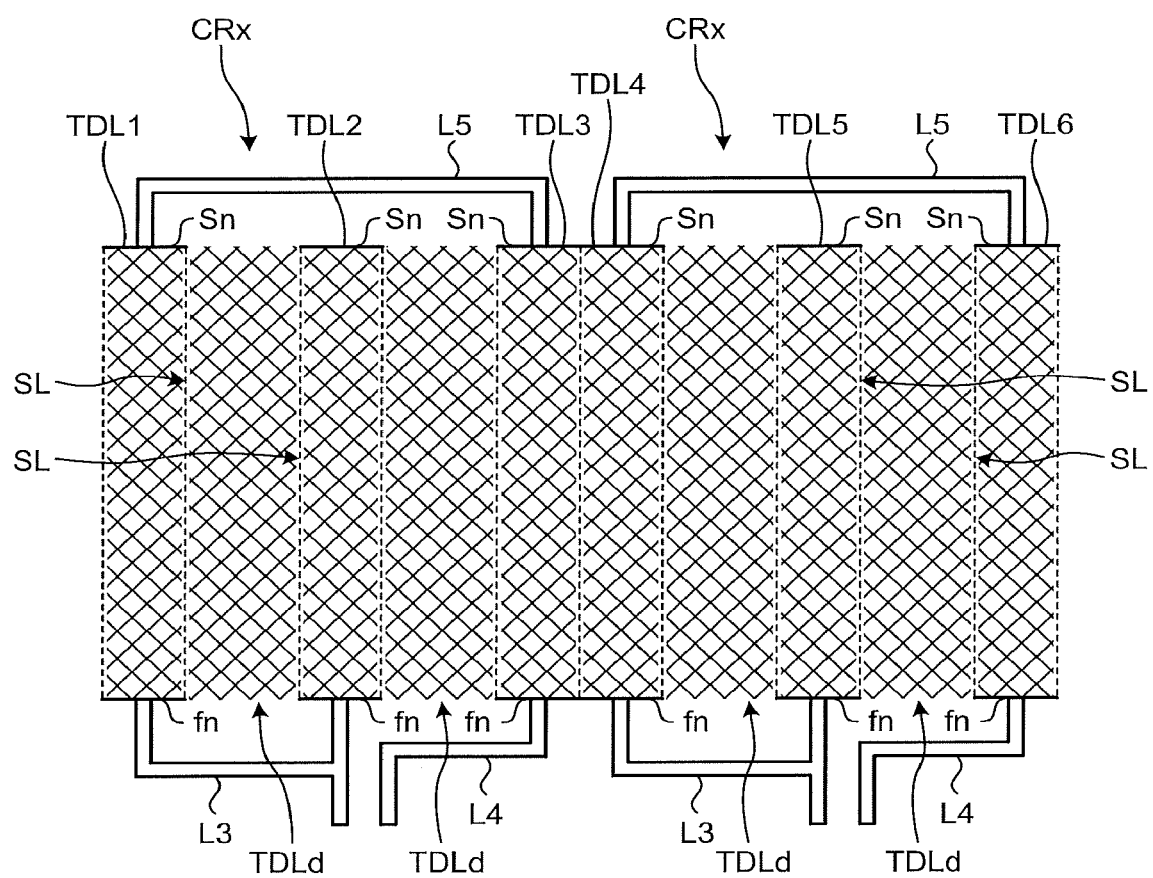
FIG. 14 is a plan view illustrating a configuration of first electrodes.

FIG. 14 is a plan view illustrating a configuration of the first electrodes. FIG. 14 illustrates six first electrodes TDL1, TDL2, TDL3, TDL4, TDL5, and TDL6 of the first electrodes TDL. In the following description, the six first electrodes TDL1, TDL2, TDL3, TDL4, TDL5, and TDL6 will each be referred to as a first electrode TDL when they need not be distinguished from one another.

The first electrodes TDL are made by forming thin metal wires having a width of several micrometers to several tens micrometers into a mesh. Dummy electrodes TDLd are provided between adjacent first electrodes TDL. The dummy electrodes TDLd are fabricated from mesh-shaped thin metal wires similar to those of the first electrodes TDL. Each of the dummy electrodes TDLd is isolated by slits SL from the first electrodes TDL, and is not coupled to wiring L3, L4, and L5. That is, the dummy electrodes TDLd are in the floating state. The configuration described above reduces a difference in light transmittance between a portion provided with the first electrodes TDL and a portion provided with the dummy electrodes TDLd.

Each of the first electrodes TDL1 to TDL6 has one end Sn and the other end fn. The other end fn of the first electrode TDL1 is coupled to the other end fn of the first electrode TDL2 through the wiring L3. The wiring L4 is coupled to the other end fn of the first electrode TDL3. One end Sn of the first electrode TDL1 is coupled to one end Sn of the first electrode TDL3 through the wiring L5. Either the wiring L3 or the wiring L4 is coupled to the first and second AFEs 47A and 47B through the multiplexer (refer to FIG. 8). The other of the wiring L3 and the wiring L4 is coupled to ground (not illustrated). The first electrodes TDL4, TDL5, and TDL6 have the same configuration.

In this manner, the first electrode TDL1, the wiring L5, and the first electrode TDL3 are coupled together so as to form a loop surrounding the dummy electrodes TDLd and the first electrode TDL2. As a result, the first electrode TDL1, the wiring L5, and the first electrode TDL3 constitute one of the receiving coils CRx in the electromagnetic induction method. Specifically, when the magnetic field M2 from the touch pen 100 (refer to FIG. 4) passes through a region surrounded by the first electrode TDL1, the wiring L5, and the first electrode TDL3, an electromotive force corresponding to a variation in the magnetic field M2 is generated in the first electrode TDL1, the wiring L5, and the first electrode TDL3. A signal corresponding to the electromotive force is supplied to the first AFE 47A. Thus, the touch pen 100 can be detected.

In the capacitance method, the first electrodes TDL1, TDL2, and TDL3 are electrically coupled to one another, and serve as one detection electrode block. Each of the first electrodes TDL1, TDL2, and TDL3 supplies a signal corresponding to a change in electrostatic capacitance between the first electrode and the common electrodes COML to the second AFE 47B. Thus, the detection target body, such as the finger, can be detected.

Figure 15:
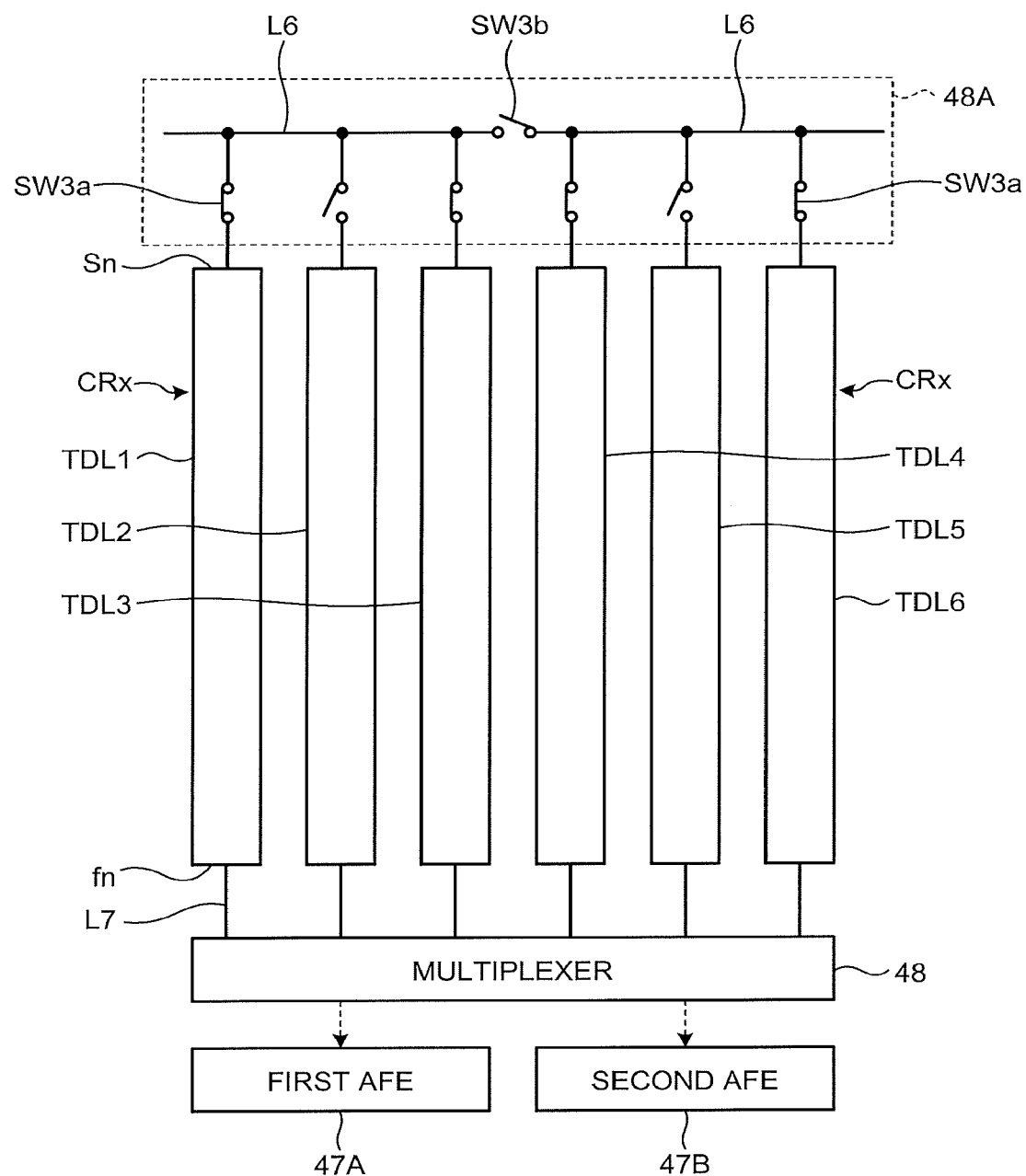
FIG. 15 is an explanatory diagram illustrating another example of the configuration of the first electrodes.

FIG. 15 is an explanatory diagram illustrating another example of the configuration of the first electrodes. As illustrated in FIG. 15, a switching circuit 48A is provided on the one end Sn side of the first electrodes TDL, and the multiplexer 48 is provided on the other end fn side of the first electrodes TDL. The switching circuit 48A switches between coupling and uncoupling between respective ends Sn on the same side of the first electrodes TDL. For ease of viewing, FIG. 15 schematically illustrates the first electrodes TDL while omitting the dummy electrodes TDLd (refer to FIG. 14). Also in this modification, the first electrodes TDL are fabricated from the mesh-shaped thin metal wires in the same manner as in FIG. 14.

The switching circuit 48A includes a plurality of lines of wiring L6, switches SW3a, and a switch SW3b. The switches SW3a are provided between respective ends Sn of the first electrodes TDL and the wiring L6. The switch SW3b is provided between the lines of the wiring L6. The other ends fn of the first electrodes TDL are coupled to the multiplexer 48 through respective wirings L7.

In the electromagnetic induction method, in response to the control signal from the controller 11, a pair of the switches SW3a coupled to the first electrode TDL1 and the first electrode TDL3 are turned on, and the switch SW3a coupled to the first electrode TDL2 is turned off. Thus, the switching circuit 48A electrically couples together the respective ends Sn on the same side of the pair of the first electrode TDL1 and the first electrode TDL3 through the wiring L6.

The first electrode TDL1, the wiring L6, and the first electrode TDL3 are coupled together so as to form a loop, and serve as one of the receiving coils CRx in the electromagnetic induction method. The same applies to the first electrode TDL4, the wiring L6, and the first electrode TDL6.

The multiplexer 48 couples the other end fn of either the first electrode TDL1 or the first electrode TDL3 to the first AFE 47A. As a result, a signal corresponding to an electromotive force generated in the pair of the first electrode TDL1 and the first electrode TDL3 is supplied to the first AFE 47A.

During the second sensing period Pes, all the switches SW3a and the SW3b are turned off. As a result, the ends Sn of the first electrodes TDL are uncoupled from one another. The multiplexer 48 couples the other end fn of each of the first electrodes TDL to the second AFE 47B. Each of the first electrodes TDL supplies a signal corresponding to a change in electrostatic capacitance between the first electrode and the common electrodes COML to the second AFE 47B. Thus, the detection target body, such as the finger, can be detected.

In the present modification, only one switch SW3b is illustrated. However, the switches SW3b may be provided between adjacent pairs of the first electrodes TDL. The first electrodes TDL constituting the receiving coils CRx can be appropriately changed by switching the operations of the switches SW3a and SW3b in response to the control signal from the controller 11.

Figure 16:
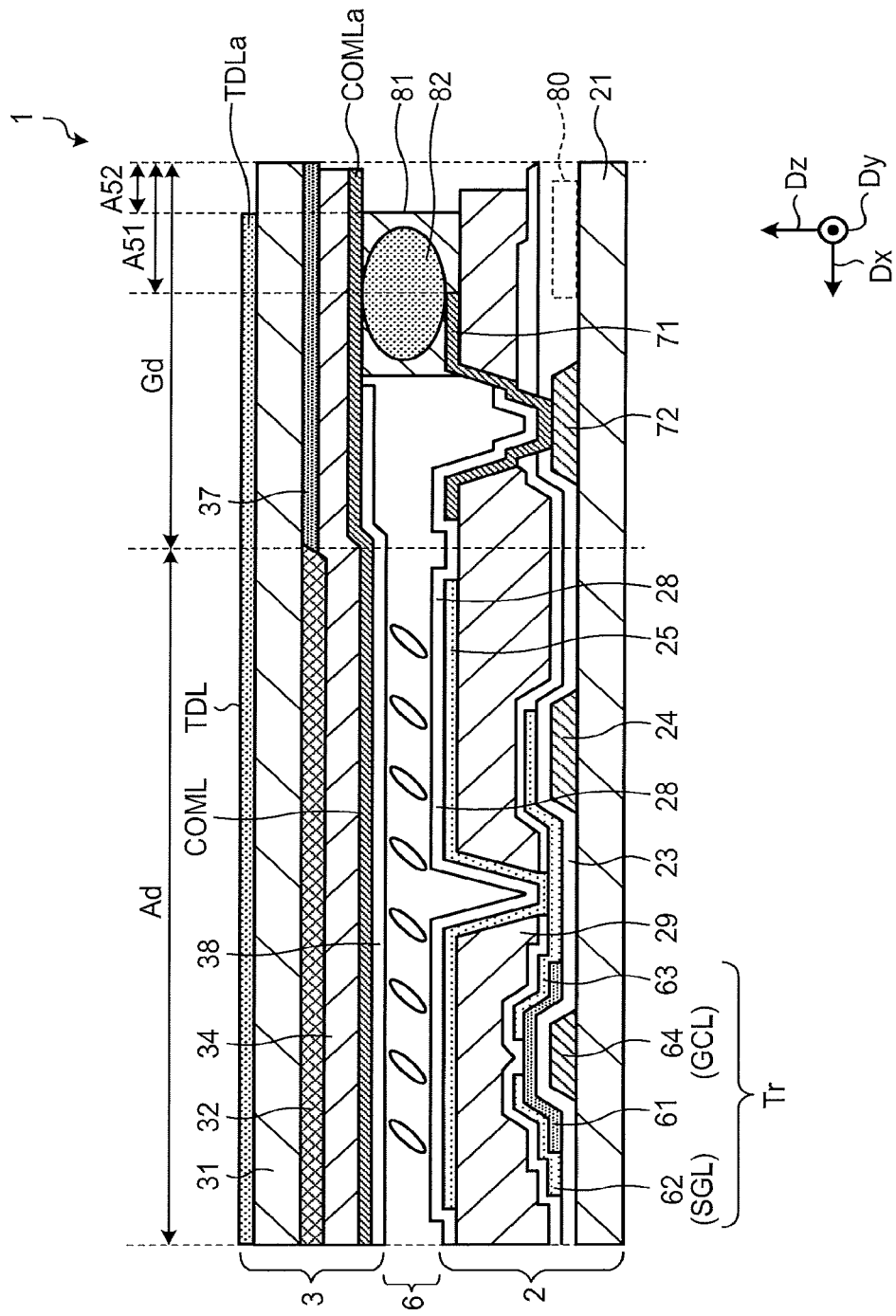
FIG. 16 is a schematic sectional diagram for explaining a coupling configuration between the common electrodes and second electrodes.
Figure 17:
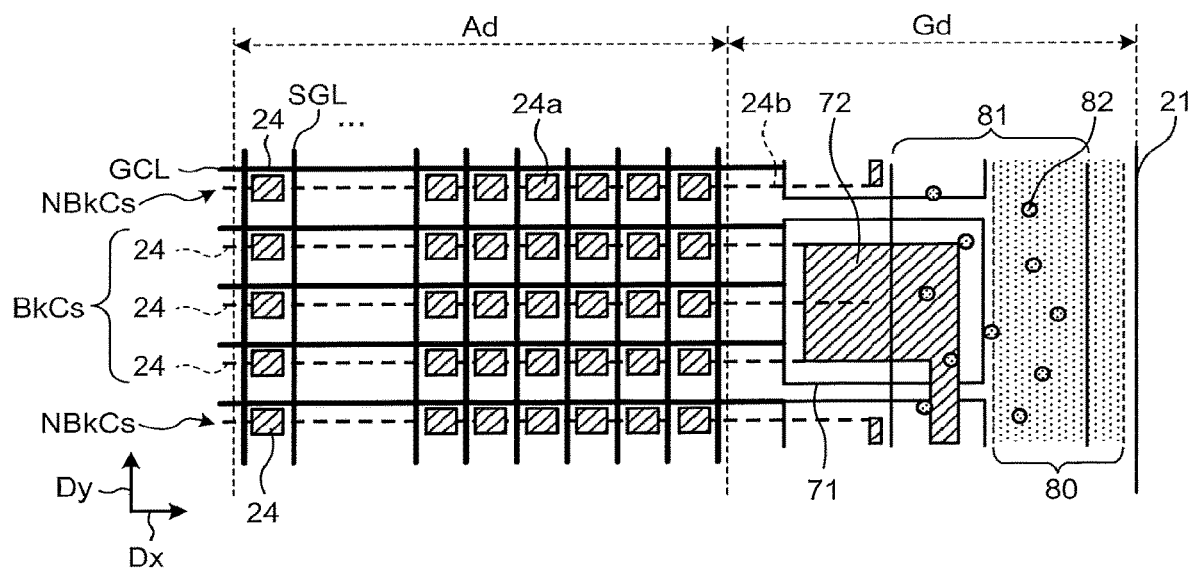
FIG. 17 is a plan view schematically illustrating the second electrodes and a conductive portion.
Figure 18:
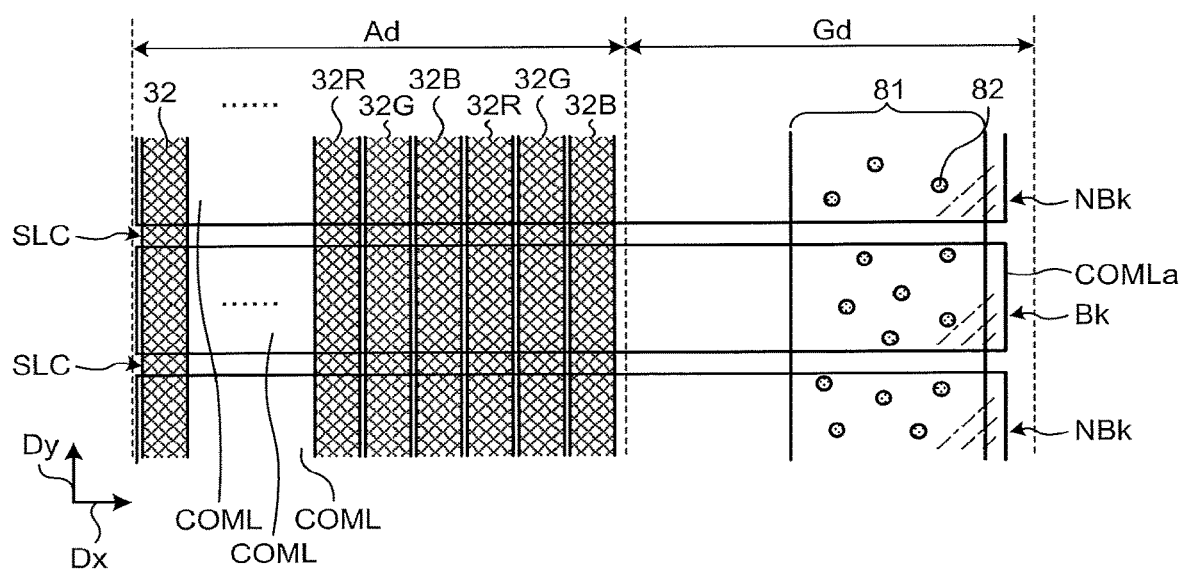
FIG. 18 is a plan view schematically illustrating the common electrodes and the conductive portion.

The following describes a coupling configuration between the second electrodes 24 and the common electrodes COML. FIG. 16 is a schematic sectional diagram for explaining the coupling configuration between the common electrodes and second electrodes. FIG. 17 is a plan view schematically illustrating the second electrodes and a conductive portion. FIG. 18 is a plan view schematically illustrating the common electrodes and the conductive portion.

FIG. 16 illustrates a portion for one pixel at the outermost circumference of the display region Ad and the peripheral region Gd adjacent thereto. As illustrated in FIG. 16, in the pixel substrate 2, for example, the switching elements Tr, the pixel electrodes 25, the second electrodes 24, coupling electrodes 72, the insulating layer 23, the planarizing film 29, and the orientation film 28 are provided on the first substrate 21. The orientation film 28 is provided so as to cover the pixel electrodes 25 in the display region Ad. The orientation film 28 is provided in a region not overlapping with a conductive portion 81 in the peripheral region Gd and overlaps with a part of a conductive layer 71. Each of the switching elements Tr includes a gate electrode 64, a source electrode 62, a semiconductor layer 61, and a drain electrode 63. The gate electrode 64 is provided in the same layer as that of the gate lines GCL. A part of each of the gate lines GCL may be used as the gate electrode 64. The source electrode 62 is provided in the same layer as that of the signal lines SGL. A part of each of the signal lines SGL may be used as the source electrode 62.

Each of the pixel electrodes 25 is coupled to the drain electrode 63 through a contact hole provided in the planarizing film 29. The second electrodes 24 are provided in the same layer as that of the gate electrode 64 (gate line GCL). As illustrated in FIG. 17, the second electrodes 24 are electrically coupled to a corresponding one of the coupling electrodes 72.

In the counter substrate 3, the color filter 32 is provided on one surface of the second substrate 31. A decorative layer 37 is provided in the peripheral region Gd of the second substrate 31. An overcoat layer 34 is provided so as to cover the color filter 32 and the decorative layer 37. The common electrodes COML are provided between the overcoat layer 34 and the liquid crystal layer 6. The first electrodes TDL are provided on the other surface of the second substrate 31. The common electrodes COML are continuously provided from the display region Ad to the peripheral region Gd. Portions of the common electrodes COML provided in the peripheral region Gd serve as coupling portions COMLa. The orientation film 38 is provided so as to cover the common electrodes COML in the display region Ad. The orientation film 38 is provided in the region not overlapping with the conductive portion 81 in the peripheral region Gd and overlaps with parts of the coupling portions COMLa.

In the peripheral region Gd, the conductive portion 81 is provided between the first substrate 21 and the second substrate 31. The conductive portion 81 is a seal portion that seals between the first substrate 21 and the second substrate 31. The conductive portion 81 includes a plurality of conductive particles 82 dispersed in a sealing material. The conductive portion 81 is provided above the peripheral circuit region 80 with the planarizing film 29 interposed therebetween.

The conductive layer 71 is coupled to the coupling electrodes 72. The conductive layer 71 is made of a light-transmitting conductive material, such as ITO. The coupling portions COMLa are coupled to the conductive layer 71 through the conductive particles 82 of the conductive portion 81. As a result, the common electrodes COML are electrically coupled to the second electrodes 24.

A region A51 denotes a region outside the central portion of the conductive portion 81 up to the outer circumference of the second substrate 31. The coupling portions COMLa are preferably provided from the boundary between the display region Ad and the peripheral region Gd up to the region A51. This configuration electrically couples the coupling portions COMLa to the conductive portion 81. A region A52 denotes a region outside end portions TDLa of the first electrodes TDL up to the outer circumference of the second substrate 31, the end portions TDLa being provided in the peripheral region Gd. The coupling portions COMLa are preferably provided up to the region A52. As a result, the coupling portions COMLa are provided between the peripheral circuit region 80 and the first electrodes TDL. This configuration allows the coupling portions COMLa to shield noise from the peripheral circuit region 80.

As illustrated in FIG. 17, the second electrodes 24 include capacitive electrodes 24a and wiring 24b. The capacitive electrodes 24a are provided so as to overlap with the drain electrodes 63 and generate the retention capacitance between the capacitive electrodes 24a and the drain electrodes 63. The wiring 24b couples the capacitive electrodes 24a arranged in the first direction Dx to one another. The configuration described above forms the second electrodes 24 into a long shape having a longitudinal direction in the first direction Dx as a whole. That is, a longitudinal direction of the second electrodes 24 and a longitudinal direction of the common electrodes COML illustrated in FIG. 18 are the same direction. As illustrated in FIG. 18, the color regions 32R, 32G, and 32B of the color filter 32 intersect with the common electrodes COML in the plan view.

As illustrated in FIGS. 17 and 18, the coupling electrodes 72 are provided corresponding to the respective common electrodes COML arranged in the second direction Dy. That is, the coupling electrodes 72 are coupled in a one-to-one relation to the common electrodes COML through the conductive portion 81. A plurality of second electrodes 24 provided so as to overlap with one of the common electrodes COML are coupled to one of the coupling electrodes 72. A pair of the common electrodes COML adjacent in the second direction Dy are separated by a slit SLC. The width of the slit SLC is larger than the diameter of the conductive particles 82. This configuration electrically isolates the adjacent common electrodes COML from each other.

As illustrated in FIG. 18, one of the common electrodes COML is selected as the drive electrode block Bk. The common electrodes COML other than those selected as the drive electrode block Bk serve as the non-selected electrode block NBk. As described above, the driver IC 19 (refer to FIG. 11) supplies the various drive signals to the drive electrode block Bk.

As illustrated in FIG. 17, a plurality of second electrodes 24 overlapping with and opposed to the drive electrode block Bk are electrically coupled to the drive electrode block Bk through the conductive portion 81. As a result, these second electrodes 24 function as a second electrode block BkCs integrally with the drive electrode block Bk. The second electrode block BkCs is supplied with the same signals as the various drive signals supplied to the drive electrode block Bk.

That is, during the first sensing period Pem illustrated in FIG. 10, a plurality of second electrodes 24 overlapping with and opposed to the common electrodes COML2, COML3, COML4, COML6, COML7, and COML8 also serve as the transmitting coils CTx. Specifically, the second electrodes 24 are supplied with the first voltage VTPH and the second voltage VTPL from the driver IC 19, and generate the magnetic field M1. The magnetic field generated from the second electrodes 24 overlaps with the magnetic field generated from the common electrodes COML in the detection region Aem.

During the second sensing period Pes illustrated in FIG. 11, the second electrodes 24 overlapping with the drive electrode block Bk are also supplied with the second drive signal TSVcom from the driver IC 19. These second electrodes 24 also generate electrostatic capacitance between the second electrodes 24 and the first electrodes TDL. As a result, the detection sensitivity can be improved during the mutual-capacitive touch detection.

Whereas the common electrodes COML in the drive electrode block Bk are made of ITO, the second electrodes 24 in the second electrode block BkCs are made of a metal. Therefore, the second electrodes 24 have a significantly lower resistance than the common electrodes COML. As a result, using the second electrodes 24 as the drive electrodes can reduce dulling of the first drive signal VTP and the second drive signal TSVcom each serving as a square wave. This point will be described with reference to FIG. 19.

Figure 19:
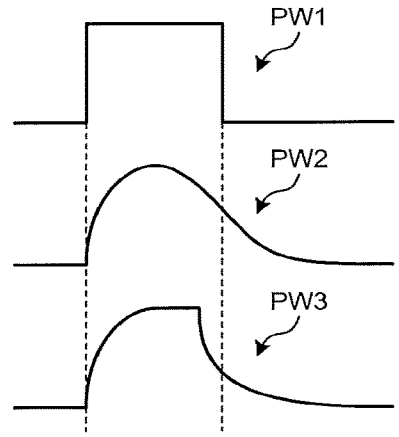
FIG. 19 is an explanatory diagram for explaining a pulse wave applied to drive electrodes.

FIG. 19 is an explanatory diagram for explaining a pulse wave applied to the drive electrodes. Each of a first pulse wave PW1, a second pulse wave PW2, and a third pulse wave PW3, which are illustrated in FIG. 19, exemplifies one pulse wave of a plurality of pulse waves included in the first drive signal VTP and the second drive signal TSVcom. The first pulse wave PW1 represents an ideal waveform of the pulse wave applied to the drive electrodes. The second pulse wave PW2 represents a waveform when only the common electrodes COML made of ITO are used as the drive electrodes. Since ITO has a high resistance, the waveform of the square wave applied thereto is made duller than that of the first pulse wave PW1. The waveform is made duller particularly when falling.

In contrast, the third pulse wave PW3 represents a waveform when the common electrodes COML made of ITO are combined with the second electrodes 24 to be used as the drive electrodes. The second electrodes 24 are metallic, and have a large area including the capacitive electrodes 24a for generating the retention capacitance of the pixels Pix (sub-pixels SPix). Therefore, the second electrodes 24 have a significantly lower resistance than that of ITO. As a result, overall response of the drive electrodes is improved, and in particular, the falling of the third pulse wave PW3 is made steeper than that of the second pulse wave PW2. As a result, in the present embodiment, responses to the drive signals are improved and the detection sensitivity is improved in both cases of the electromagnetic induction method and the mutual-capacitance method.

The common electrodes COML and the pixel electrodes 25 lie between the second electrodes 24 and the first electrodes TDL serving as the detection electrodes. Also in this case, the common electrodes COML are supplied with the same signals as those for the second electrodes 24, and the pixel electrodes 25 are substantially in the floating state. As a result, the common electrodes COML and the pixel electrodes 25 are excited in the same phase as the second electrodes 24 and can thus be restrained from hindering the function of the second electrodes 24 as the drive electrodes.

Figure 20:
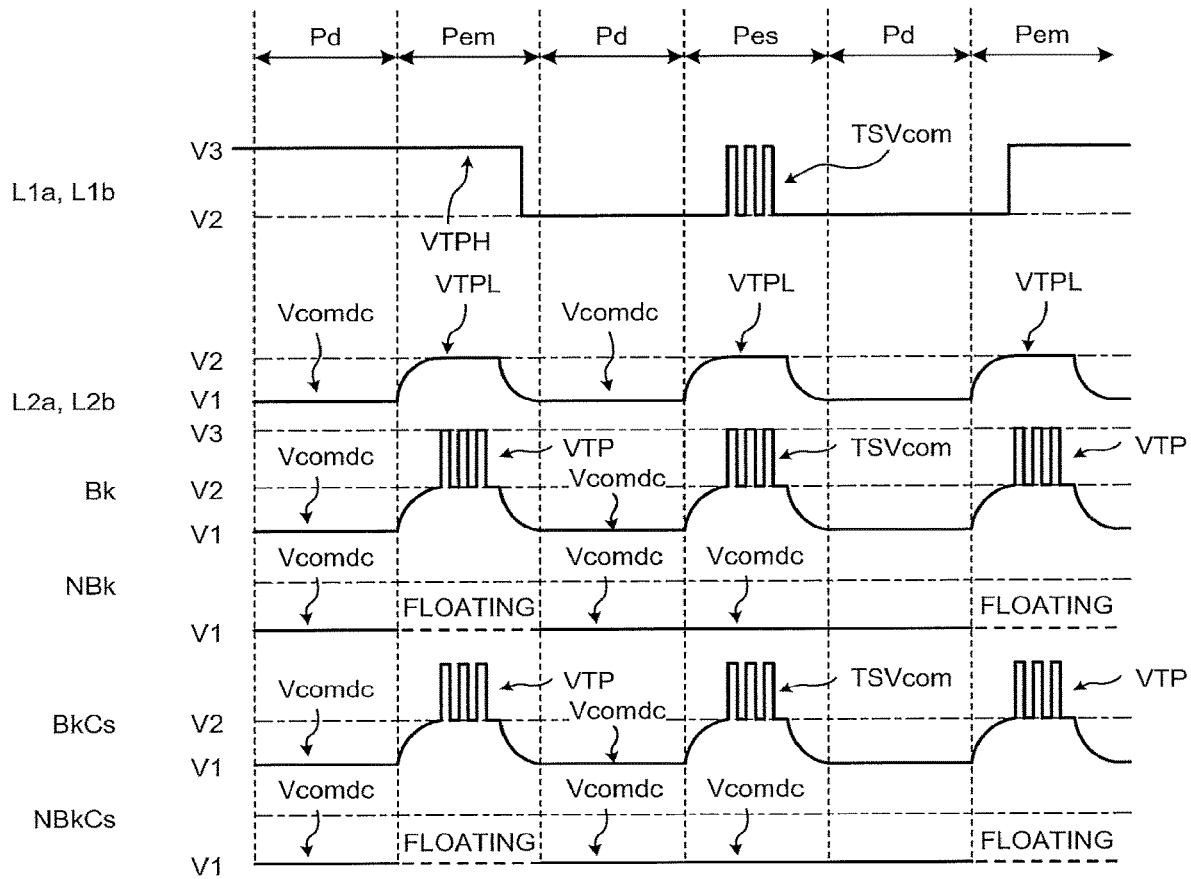
FIG. 20 is a timing waveform diagram illustrating an operation example of the display device according to the first embodiment.

FIG. 20 is a timing waveform diagram illustrating an operation example of the display device according to the first embodiment. The display device 1 performs the touch detection operation (detection period) and the display operation (display period) in a time-division manner. The touch detection operation and the display operation may be divided in any way. The following describes, for example, a method in which the touch detection and the display are performed in a time-division manner in one frame period of the display panel 10, that is, in a time required for displaying video information for one screen.

As illustrated in FIG. 20, the display periods Pd, and the first and second sensing periods Pem and Pes are alternately arranged.

The above-described display operation is performed during the display period Pd. As illustrated in FIG. 9, all the common electrodes COML are selected as the drive electrode block Bk. The driver IC 19 supplies the drive signal Vcomdc to the drive electrode block Bk through the second wiring L2a and L2b. The drive signal Vcomdc is also supplied to the second electrode block BkCs opposed to the drive electrode block Bk during the same period.

During the first sensing period Pem, the driver IC 19 alternately supplies the first voltage VTPH and the second voltage VTPL to both ends of the drive electrode block Bk, as illustrated in FIG. 10. This operation supplies the first drive signal VTP to the drive electrode block Bk. The same first drive signal VTP is also supplied to the second electrode block BkCs overlapping with and opposed to the drive electrode block Bk during the same period. The non-selected electrode block NBk and a non-selected second electrode block NBkCs are not supplied with the first drive signal VTP and are placed in the floating state.

In this manner, during the first sensing period Pem, the common electrodes COML provided on the second substrate (refer to FIGS. 5 and 16) and the second electrodes 24 provided on the first substrate 21 are simultaneously driven. As a result, the strength of the magnetic field M2 can be increased.

As illustrated in FIG. 20, the first voltage VTPH is a voltage signal having a potential V3. The second voltage VTPL is a voltage signal having a potential V2 lower than the potential V3. The drive signal Vcomdc is a voltage signal having a potential V1 lower than the potential V2.

During the second sensing period Pes, the driver IC 19 supplies the second drive signal TSVcom to the drive electrode block Bk, as illustrated in FIG. 11. The same second drive signal TSVcom is also supplied to the second electrode block BkCs overlapping with and opposed to the drive electrode block Bk during the same period. The non-selected electrode block NBk and the non-selected second electrode block NBkCs are supplied with the drive signal Vcomdc. The non-selected electrode block NBk and the non-selected second electrode block NBkCs only need to have a fixed potential, and may be supplied with the second voltage VTPL.

Figure 21:
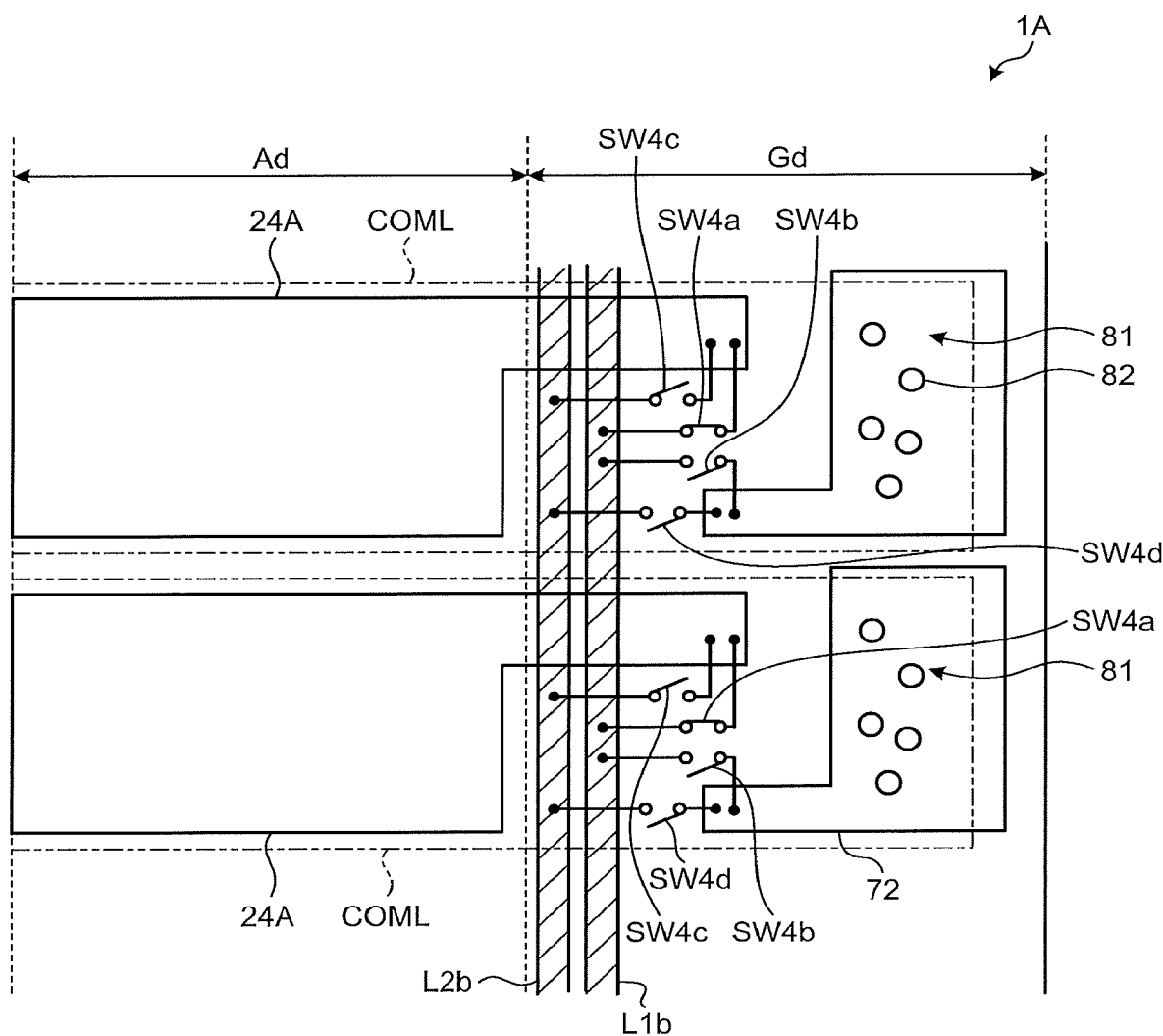
FIG. 21 is a plan view schematically illustrating second electrodes and the conductive portion according to a modification of the first embodiment.

FIG. 21 is a plan view schematically illustrating second electrodes and the conductive portion according to a modification of the first embodiment. In FIG. 21, the common electrodes COML are illustrated with long dashed double-short dashed lines. For ease of viewing, FIG. 21 illustrates one second electrode 24A overlapping with one of the common electrodes COML. Actually, however, a plurality of such second electrodes 24A overlap with a corresponding one of the common electrodes COML, as illustrated in FIGS. 17 and 18.

As illustrated in FIG. 21, the first wiring L1b and the second wiring L2b are provided in the peripheral region Gd of a display device 1A of this modification. A switch SW4a is provided between the second electrode 24A and the first wiring L1b. A switch SW4c is provided between the second electrode 24A and the second wiring L2b. The common electrode COML is electrically coupled to a corresponding one of the coupling electrodes 72 through the conductive portion 81. A switch SW4b is provided between the coupling electrode 72 and the first wiring L1b. A switch SW4d is provided between the coupling electrode 72 and the second wiring L2b.

The switches SW4a, SW4b, SW4c, and SW4d are switched between on and off in response to the control signal from the controller 11. The operations of the switches SW4a, SW4b, SW4c, and SW4d individually drive the common electrode COML and the second electrode 24A. Although not illustrated, in the same manner as in FIGS. 9 to 11, these switches and wiring are provided at both ends of the common electrode COML and the second electrode 24A.

In this modification, when the electromagnetic induction touch detection is performed, either the switch SW4a or the switch SW4c is turned on, and the switches SW4b and SW4d are turned off. As a result, the second electrode 24A is coupled to either the first wiring L1b or the second wiring L2b, and supplied with the first drive signal VTP from the driver IC 19. The common electrode COML is uncoupled from the first wiring L1b and the second wiring L2b. During the electromagnetic induction touch detection, only the second electrodes 24A are driven as the transmitting coils CTx, and the common electrodes COML are placed in the floating state.

When the mutual-capacitive touch detection is performed, the switches also operate in the same manner. That is, during the mutual-capacitive touch detection, only the second electrodes 24A are driven as the drive electrodes, and the common electrodes COML are placed in the floating state.

Figure 22:
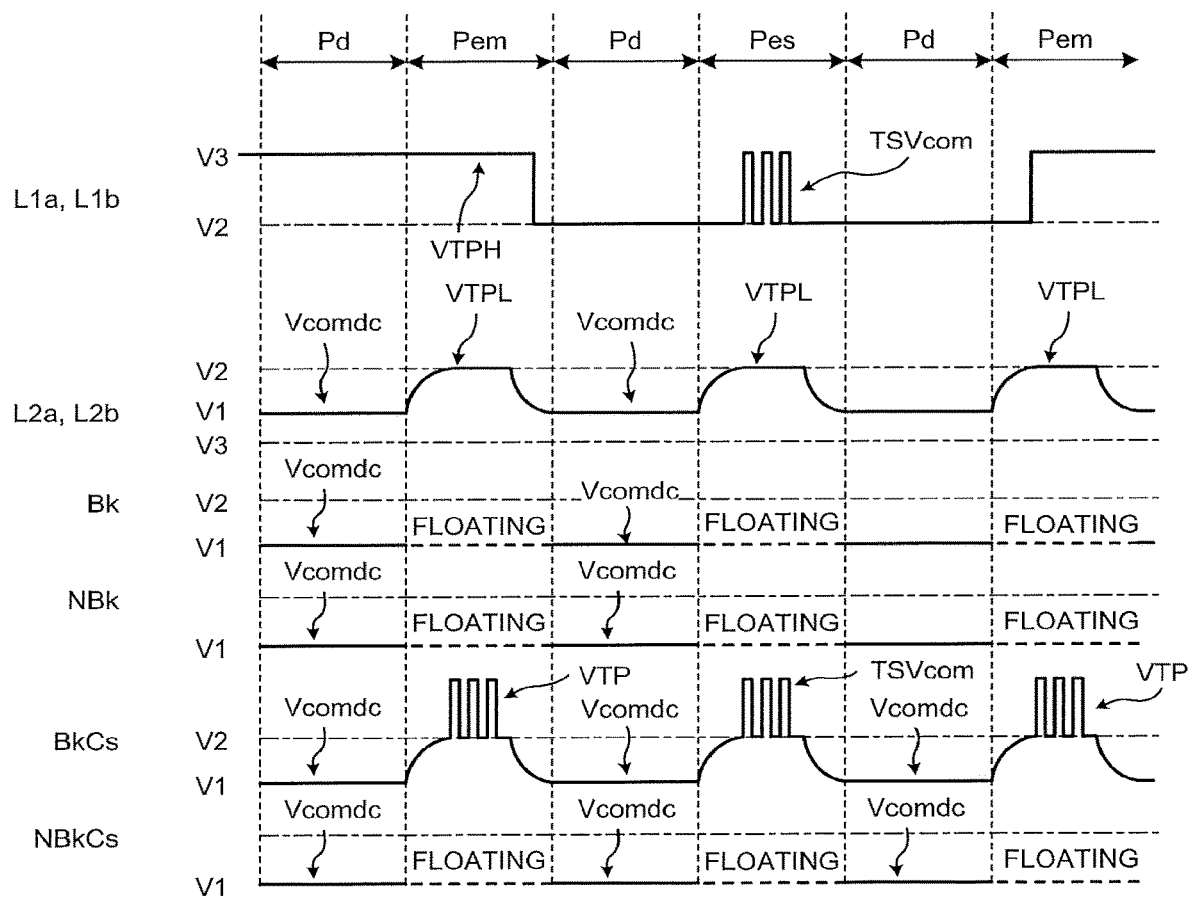
FIG. 22 is a timing waveform diagram illustrating an operation example of a display device according to the modification of the first embodiment.

FIG. 22 is a timing waveform diagram illustrating an operation example of the display device according to the modification of the first embodiment. During the display period Pd, the display operation is performed in the same manner as in the example illustrated in FIG. 20. During the first sensing period Pem, the operation of the switches SW4a and SW4c (refer to FIG. 21) causes the driver IC 19 to alternately supply the first voltage VTPH and the second voltage VTPL to both ends of the second electrode block BkCs through the first wiring L1b or the second wiring L2b. As a result, the first drive signal VTP is supplied to the second electrode block BkCs.

In the non-selected second electrode block NBkCs, the switches SW4a and SW4c illustrated in FIG. 21 are turned off. As a result, the non-selected second electrode block NBkCs is not supplied with the first drive signal VTP, and thus is placed in the floating state. The switches SW4b and SW4d are turned off during the same period. As a result, the drive electrode block Bk and the non-selected electrode block NBk overlapping with and opposed to the second electrode block BkCs are not supplied with the first drive signal VTP, and thus are placed in the floating state. In this manner, during the first sensing period Pem, only the second electrodes 24A are driven as the transmitting coils CTx.

During the second sensing period Pes, the operation of the switch SW4a causes the driver IC 19 to supply the second drive signal TSVcom to the second electrode block BkCs through the first wiring L1b. The operation of the switches SW4a and SW4c brings the non-selected second electrode block NBkCs into the floating state. During the same period, the switches SW4b and SW4d are turned off, and the drive electrode block Bk and the non-selected electrode block NBk overlapping with the second electrode block BkCs are brought into the floating state. The non-selected electrode block NBk and the non-selected second electrode block NBkCs only need to have a fixed potential, and may be supplied with the second voltage VTPL.

Second Embodiment

Figure 23:
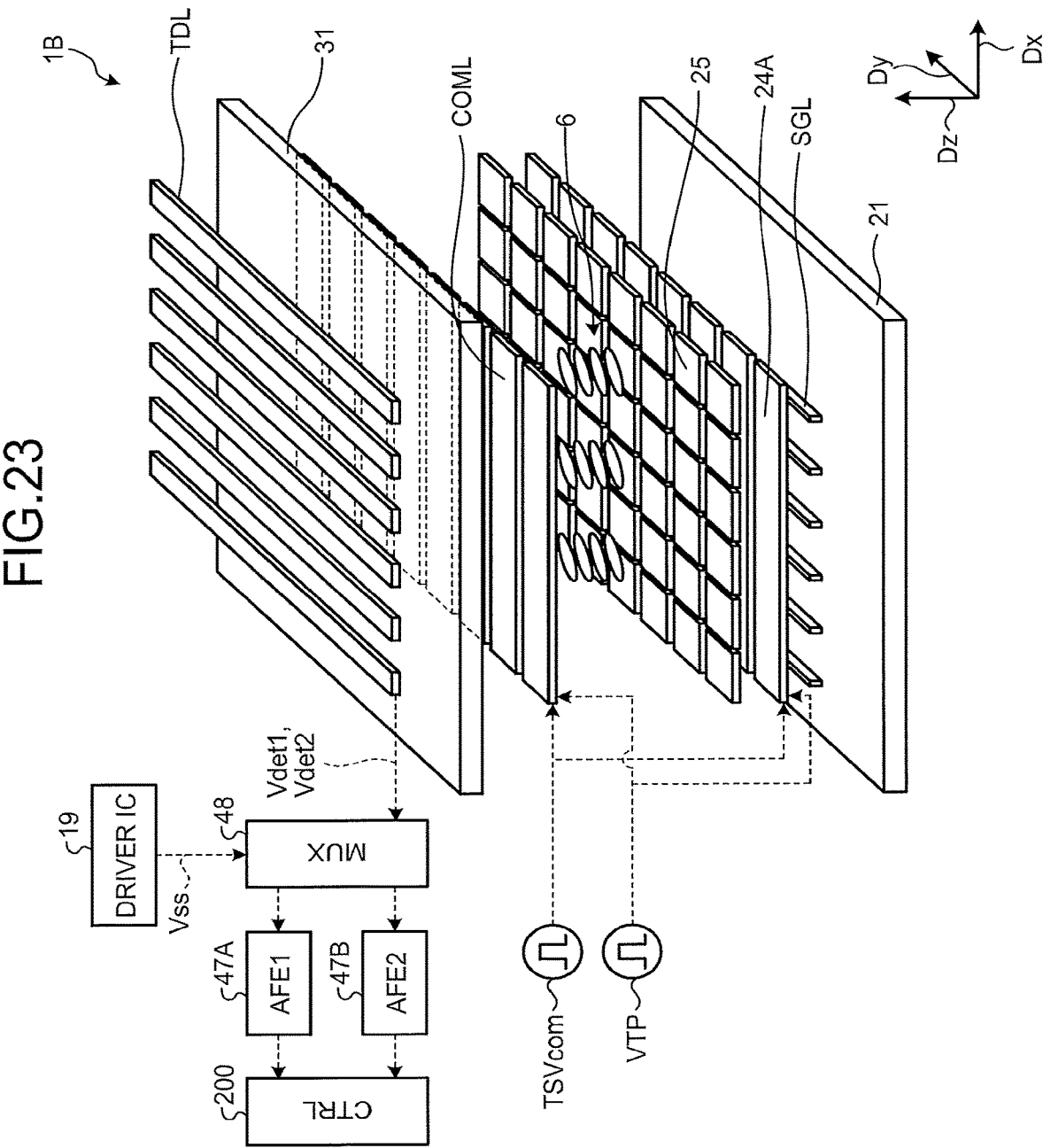
FIG. 23 is an exploded perspective view of a display device according to a second embodiment of the present disclosure.
Figure 24:
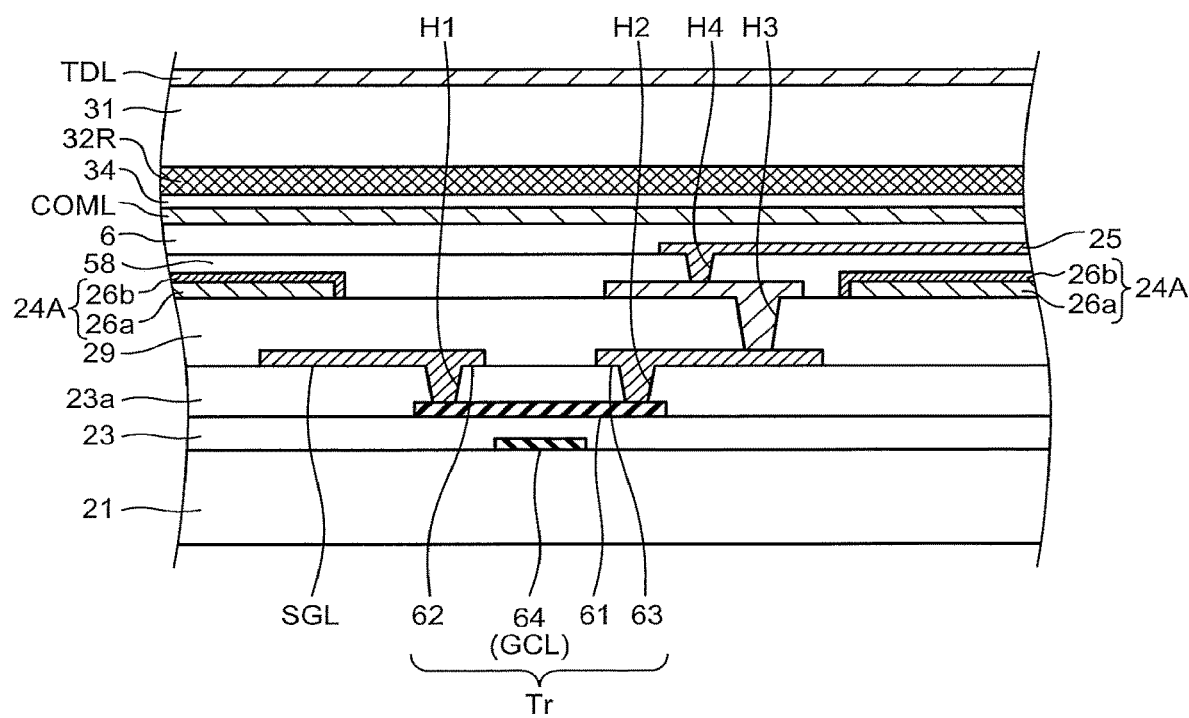
FIG. 24 is a schematic diagram illustrating a sectional structure of the display device according to the second embodiment.

FIG. 23 is an exploded perspective view of a display device according to a second embodiment of the present disclosure. FIG. 24 is a schematic diagram illustrating a sectional structure of the display device according to the second embodiment. In a display device 1B of the present embodiment, the first substrate 21, the signal lines SGL, the second electrodes 24A, the pixel electrodes 25, the liquid crystal layer 6 serving as the display functional layer, the common electrodes COML, and the first electrodes TDL are stacked in this order. In other words, the signal lines SGL are provided between the first substrate 21 and the second electrodes 24A in the direction orthogonal to the surface of the first substrate 21.

In the present embodiment, the configurations of the common electrodes COML and the first electrodes TDL are the same as those of the first embodiment, and will not be described in detail. In the same manner as in the example illustrated in FIGS. 16 to 18, the common electrodes COML are electrically coupled to the second electrodes 24A through the conductive portion 81. Also in the present embodiment, the common electrodes COML and the second electrodes 24A are supplied with the first drive signal VTP during the electromagnetic induction touch detection, and supplied with the second drive signal TSVcom during the mutual-capacitive touch detection. The first electrodes TDL output the first detection signals Vdet1 during the electromagnetic induction touch detection, and output the second detection signals Vdet2 during the mutual-capacitive touch detection.

As illustrated in FIG. 24, the switching elements Tr are provided on the first substrate 21. The planarizing film 29 is provided so as to cover the source electrodes 62 (signal lines SGL) and the drain electrodes 63. The second electrodes 24A are provided on a surface of the planarizing film 29. An insulating layer 58 is provided so as to cover the second electrodes 24A. The pixel electrodes 25 are provided on the insulating layer 58. The pixel electrodes 25 are electrically coupled to the drain electrodes 63 through contact holes H3 and H4.

The second electrodes 24A are provided so as to overlap with the pixel electrodes 25 across the insulating layer 58 in the direction orthogonal to the surface of the first substrate 21. This configuration generates retention capacitance between the second electrodes 24A and the pixel electrodes 25.

Each of the second electrodes 24A includes a metal layer 26a and a light-transmitting conductive layer 26b covering the metal layer 26a. At least one metal material, such as aluminum (Al), copper (Cu), silver (Ag), molybdenum (Mo), or an alloy thereof, is used for the metal layer 26a. For example, ITO is used for the light-transmitting conductive layer 26b.

In the present embodiment, the second electrodes 24A are provided in a layer different from that of the switching elements Tr. As a result, each of the second electrodes 24A can have a shape with a large area with minimal restriction by, for example, the gate lines GCL and the signal lines SGL. This configuration can increase the overlapping area of the second electrodes 24A and the pixel electrodes 25 so as to increase the retention capacitance. In the same manner as in the first embodiment, the responses to the first drive signal VTP and the second drive signal TSVcom are improved.

Third Embodiment

Figure 25:
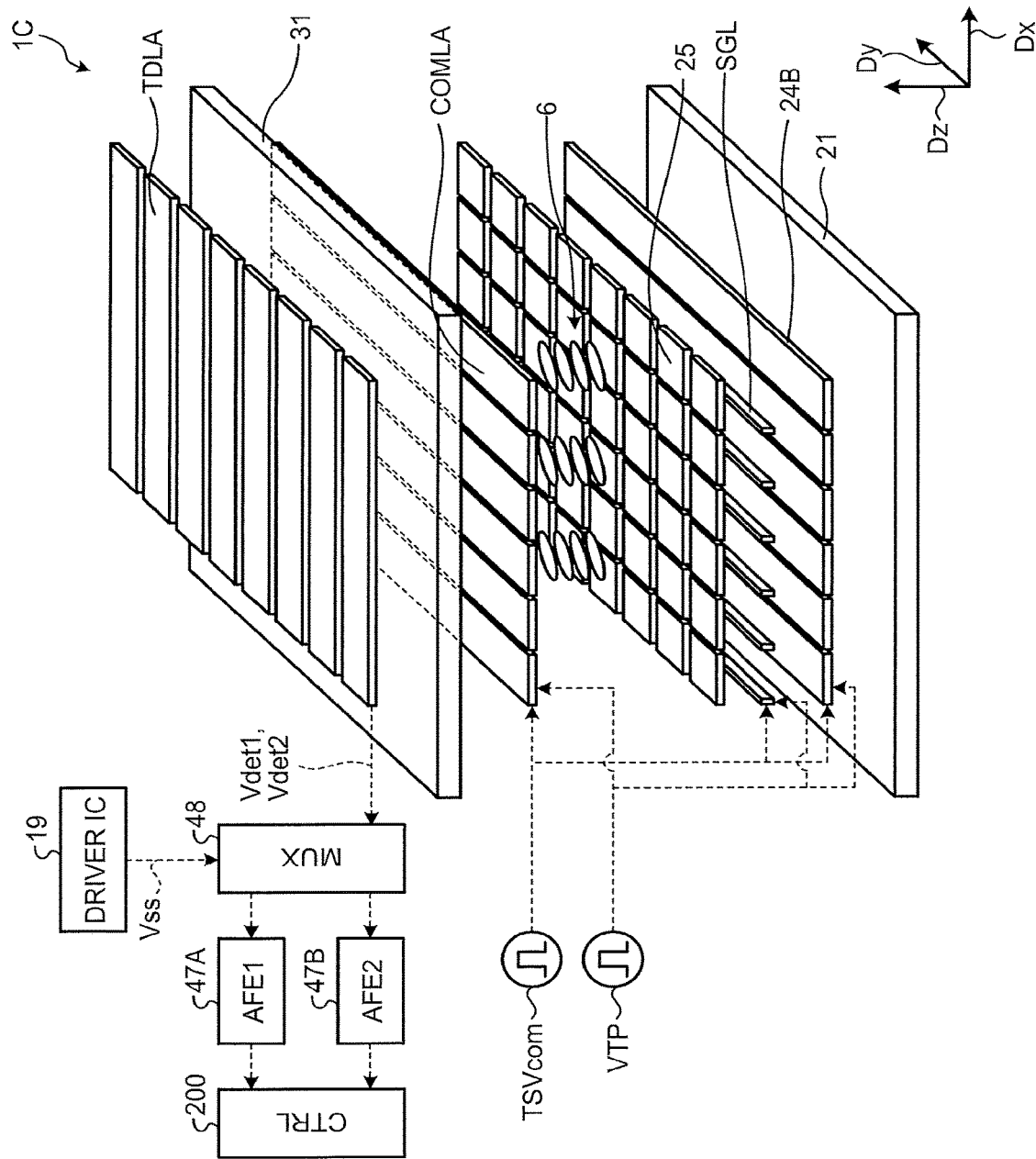
FIG. 25 is an exploded perspective view of a display device according to a third embodiment of the present disclosure.

FIG. 25 is an exploded perspective view of a display device according to a third embodiment of the present disclosure. In a display device 1C of the present embodiment, the first substrate 21, second electrodes 24B, the signal lines SGL, the pixel electrodes 25, the liquid crystal layer 6 serving as the display functional layer, a plurality of common electrodes COMLA, and a plurality of first electrodes TDLA are stacked in this order. The common electrodes COMLA are provided so as to extend in the second direction Dy, and are arranged in the first direction Dx. The first electrodes TDLA are provided so as to extend in the first direction Dx, and are arranged in the second direction Dy. Also in the present embodiment, the first electrodes TDLA intersect with the common electrodes COMLA in a plan view. Both the common electrodes COMLA and the first electrodes TDLA are formed into strips.

The signal lines SGL are disposed between the first substrate 21 and the liquid crystal layer 6 in the direction orthogonal to the surface of the first substrate 21. The signal lines SGL extend in the second direction Dy and are arranged from one side to the other side of the first substrate 21, those side extending along the second direction Dy. In the present embodiment, the common electrodes COMLA and the second electrodes 24B are provided along the signal lines SGL in the plan view.

When the electromagnetic induction touch detection is performed, the driver IC 19 supplies the first drive signal VTP to the common electrodes COMLA, the signal lines SGL, and the second electrodes 24B. That is, in addition to the common electrodes COMLA, the signal lines SGL and the second electrodes 24B also serve as the transmitting coils CTx in the electromagnetic induction method.

When the mutual-capacitive touch detection is performed, the driver IC 19 supplies the second drive signal TSVcom to the common electrodes COMLA, the signal lines SGL, and the second electrodes 24B in a time-division manner. As a result, in addition to the common electrodes COMLA, the signal lines SGL and the second electrodes 24B also serve as the drive electrodes in the mutual-capacitive touch detection. The second detection signal Vdet2 is generated corresponding to a change in electrostatic capacitance between the first electrodes TDLA and the drive electrodes including the common electrodes COMLA, the signal lines SGL, and the second electrodes 24B, and is supplied from the first electrodes TDLA to the second AFE 47B through the multiplexer 48. As a result, the mutual-capacitive touch detection is performed.

In the present embodiment, in the electromagnetic induction method and the mutual-capacitance method, the common electrodes COMLA, the signal lines SGL, and the second electrodes 24B are simultaneously driven. As a result, the detection sensitivity can be improved in the mutual-capacitive touch detection and the electromagnetic induction touch detection.

Figure 26:
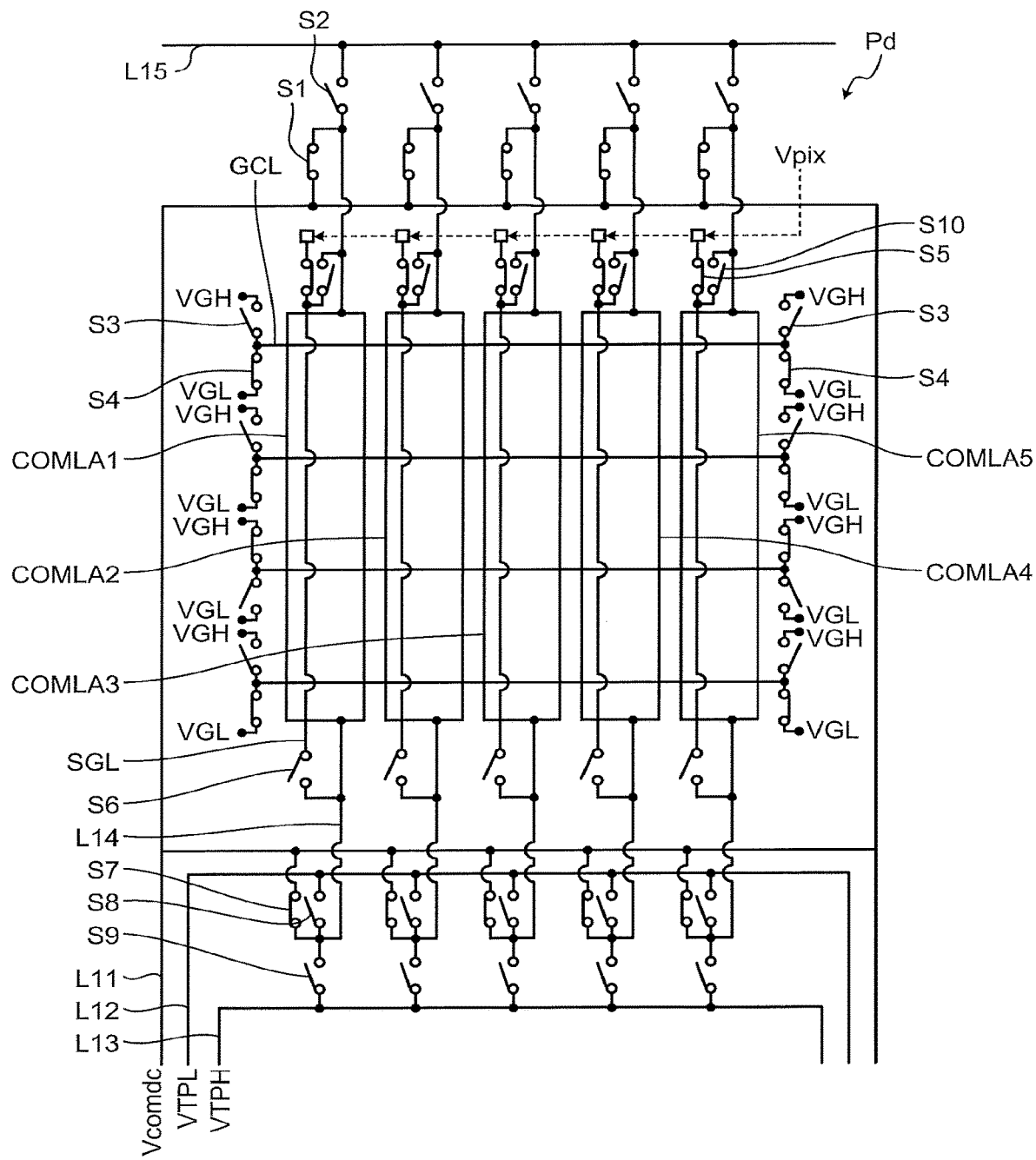
FIG. 26 is a circuit diagram for explaining a coupling configuration of common electrodes during the display period.
Figure 27:
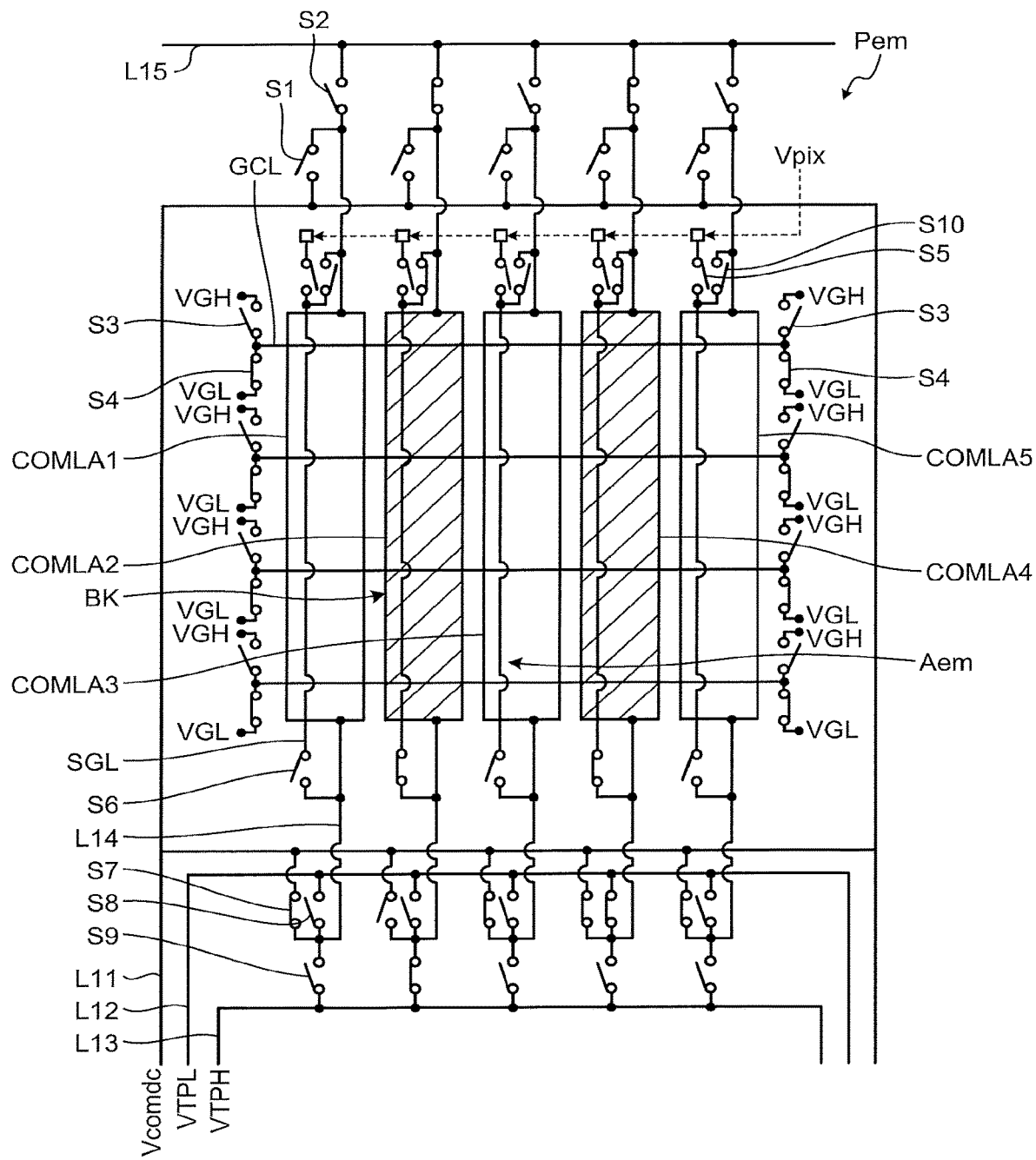
FIG. 27 is a circuit diagram illustrating a coupling configuration of the common electrodes during the first sensing period.
Figure 28:
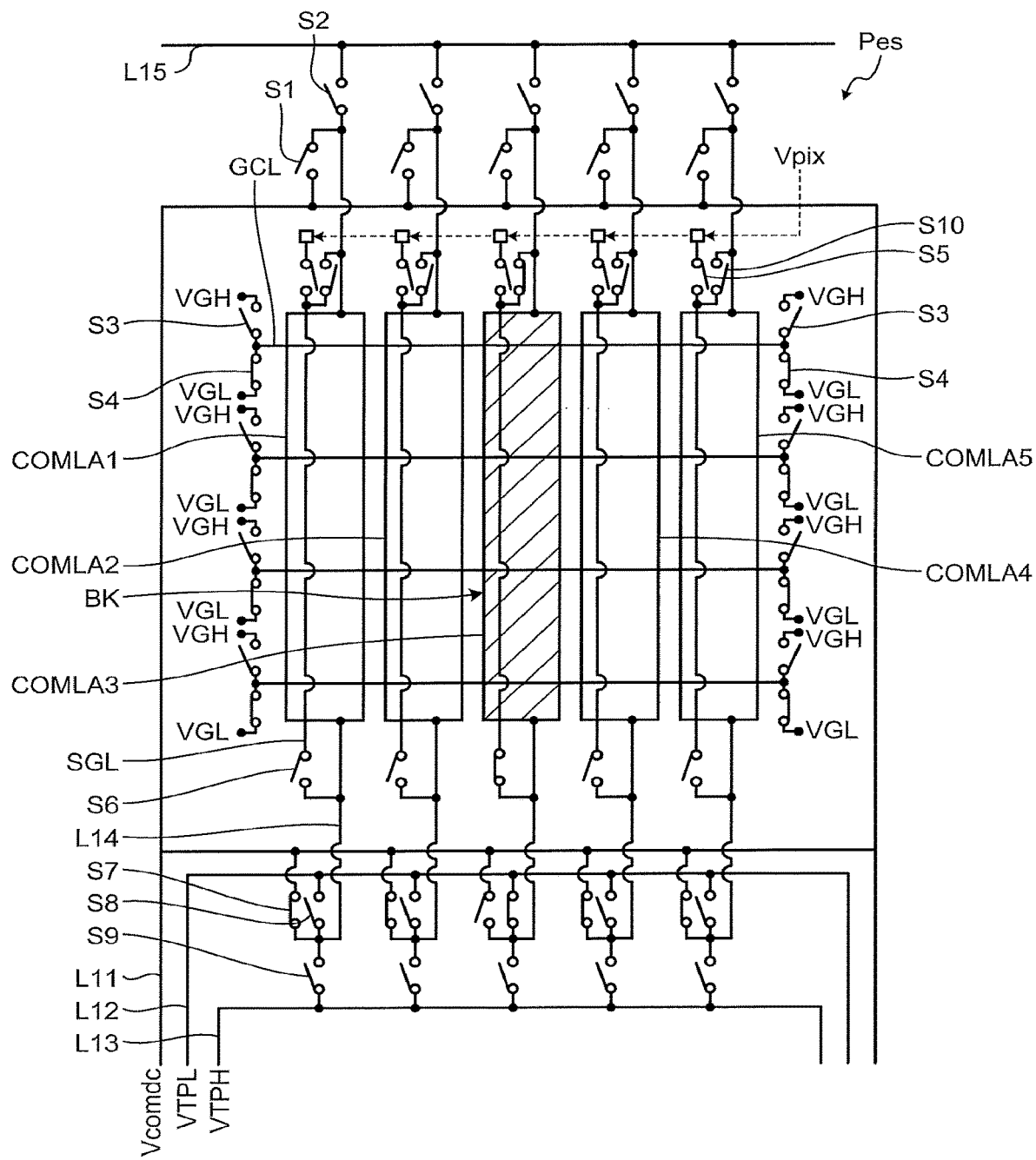
FIG. 28 is a circuit diagram illustrating a coupling configuration of the common electrodes during the second sensing period.

The following describes coupling configurations of the common electrodes COMLA. FIG. 26 is a circuit diagram for explaining the coupling configuration of the common electrodes during the display period. FIG. 27 is a circuit diagram illustrating another coupling configuration of the common electrodes during the first sensing period. FIG. 28 is a circuit diagram illustrating still another coupling configuration of the common electrodes during the second sensing period. FIGS. 26 to 28 illustrate five common electrodes COMLA1, COMLA2, COMLA3, COMLA4, and COMLA5. These five common electrodes will each be referred to as a common electrode COMLA when they need not be distinguished from one another.

As illustrated in FIGS. 26 to 28, the drive signal Vcomdc for display is supplied to the common electrodes COMLA through wiring L11. The second voltage VTPL is supplied to the common electrodes COMLA and the signal lines SGL through wiring L12. The first voltage VTPH is supplied to the common electrodes COMLA and the signal lines SGL through wiring L13. Wiring L14 couples the common electrodes COMLA to the wiring L11, the wiring L12, and the wiring L13. Wiring L15 couples the same ends of the common electrodes COMLA to one another.

Switches S1 are provided between the wiring L11 and the common electrodes COMLA. Switches S2 are provided between the wiring L15 and the common electrodes COMLA. A high-level voltage VGH of the scan signal Vscan (refer to FIG. 1) is supplied to the gate lines GCL through switches S3. A low-level voltage VGL of the scan signal Vscan is supplied to the gate lines GCL through switches S4. The pixel signals Vpix are supplied to the signal lines SGL through switches S5.

Switches S6 are provided between the signal lines SGL and the common electrodes COMLA. Switches S7 are provided between the wiring L11 and the wiring L14 coupled to the common electrodes COMLA. Switches S8 are provided between the wiring L12 and the wiring L14 coupled to the common electrodes COMLA. Switches S9 are provided between the wiring L13 and the wiring L14 coupled to the common electrodes COMLA. Switches S10 are provided between the signal lines SGL and the common electrodes COMLA and face the switches S6 across the common electrodes COMLA. The switches S6 and the switches S10 switches between coupling and uncoupling corresponding ends, that is, ends on the same side, of the corresponding signal lines SGL and the corresponding common electrodes COMLA.

As illustrated in FIG. 26, the switches S1 and S7 are turned on during the display period Pd. As a result, one end of each of the common electrodes COMLA is coupled to the wiring L11 through the corresponding switch S1, and the other end thereof is coupled to the wiring L11 through the wiring L14 and the corresponding switch S7. As a result, the drive signal Vcomdc for display is supplied to each of the common electrodes COMLA through the wiring L11. In this manner, the drive signal Vcomdc for display is supplied to both ends of each of the common electrodes COMLA.

The switches S3 and the switches S4 coupled to the gate lines GCL operate in a manner inverted from each other. The switches S3 are sequentially turned on to supply the high-level voltage VGH of the scan signal Vscan to a selected one of the gate lines GCL. The others of the gate lines GCL not selected are supplied with the low-level voltage VGL. The switches S5 are turned on to supply the pixel signals Vpix to the signal lines SGL.

During the display period Pd, the switches S6 and S10 are turned off to uncouple the signal lines SGL from the common electrodes COMLA. All the switches S8 and S9 are turned off to uncouple the respective common electrodes COMLA from the wiring L12 and L13. As a result, the first voltage VTPH and the second voltage VTPL are not supplied to the common electrodes COMLA and the signal lines SGL.

As illustrated in FIG. 27, during the first sensing period Pem, the switches S5 are turned off, and some of the switches S6 and S10 are turned on. As a result, some of the common electrodes COMLA are electrically coupled to some of the signal lines SGL overlapping with those common electrodes COMLA. Some of the common electrodes COMLA and some of the signal lines SGL are supplied with the same drive signal through the wiring L14.

The following describes a case where the common electrodes COMLA2 and COMLA4 are selected as the drive electrode block Bk during the first sensing period Pem illustrated in FIG. 27. A region between the common electrodes COMLA2 and COMLA4 serves as the detection region Aem. Specifically, the switches S2 coupled to one end of the common electrode COMLA2 and one end of the common electrode COMLA4 are turned on. As a result, one end of the common electrode COMLA2 is coupled to one end of the common electrode COMLA4 through the wiring L15. The common electrode COMLA2, the wiring L15, and the common electrode COMLA4 are coupled together so as to form a loop and serve as the transmitting coil CTx.

The switch S8 coupled to the other end of the common electrode COMLA2 is turned off, and the switch S9 coupled thereto is turned on. As a result, the other end of the common electrode COMLA2 and a corresponding one of the signal lines SGL are supplied with the first voltage VTPH through the wiring L13 and L14. The switch S8 coupled to the other end of the common electrode COMLA4 is turned on, and the switch S9 coupled thereto is turned off. As a result, the other end of the common electrode COMLA4 and a corresponding one of the signal lines SGL are supplied with the second voltage VTPL through the wiring L12 and the wiring L14.

Currents corresponding to a potential difference between the first voltage VTPH and the second voltage VTPL flow in the common electrodes COMLA2 and COMLA4. These currents generate a magnetic field passing through the detection region Aem. In this manner, switching the operations of the switches S8 and S9 causes the common electrodes COMLA2 and COMLA4 to be supplied with the first drive signal VTP. The currents flowing in the common electrodes COMLA2 and COMLA4 generate the magnetic field to cause the electromagnetic induction. The electromotive force based on the electromagnetic induction is generated in the first electrodes TDLA (refer to FIG. 25).

The switches S8 and S9 coupled to the other ends of the common electrodes COML1, COML3, and COML5 are turned off, and the switches S7 coupled thereto are turned on. As a result, the common electrodes COML1, COML3, and COML5 are supplied with the drive signal Vcomdc through the wiring L11.

During the first sensing period Pem, all the switches S3 are turned off, and all the switches S4 are turned on. As a result, the gate lines GCL are supplied with the low-level voltage VGL as a direct-current voltage signal. All the switches S5 are turned off, and thus, none of the signal lines SGL are supplied with the pixel signal Vpix.

As illustrated in FIG. 28, also during the second sensing period Pes, the switches S5 are turned off, and one of the switches S6 and a corresponding one of the switches S10 are turned on. As a result, one of the common electrodes COMLA is electrically coupled to one of the signal lines SGL overlapping with the common electrode COMLA. The controller 11 sequentially selects the drive electrode block Bk so as to perform the touch detection in the display region Ad using the mutual-capacitance method.

The following describes a case where the common electrode COMLA3 is selected as the drive electrode block Bk during the second sensing period Pes illustrated in FIG. 28. Specifically, the switch S8 and the switch S9 that are coupled to the other end of the common electrode COMLA3 alternately repeat on/off operations. As a result, the first voltage VTPH and the second voltage VTPL are alternately supplied to the common electrode COMLA3 and the signal line SGL overlapping therewith. This operation supplies the second drive signal TSVcom to the common electrode COMLA3 and the signal line SGL overlapping therewith.

The switches S7 coupled to the other ends of the common electrodes COMLA1, COMLA2, COMLA4, and COMLA5 are turned on. As a result, the common electrodes COMLA1, COMLA2, COMLA4, and COMLA5 are supplied with the drive signal Vcomdc through the wiring L11. The controller 11 sequentially selects the drive electrode block Bk so as to perform the touch detection in the display region Ad using the capacitance method.

With the coupling configurations described above, the common electrodes COML and the signal lines SGL are switched between coupling and uncoupling to and from each other according to the periods. The signal lines SGL, as well as the common electrodes COMLA, serve as the transmitting coils CTx during the first sensing period Pem, and also serve as the drive electrodes during the second sensing period Pes. As a result, the detection sensitivity can be improved in the electromagnetic induction method and the mutual-capacitance method.

Figure 29:
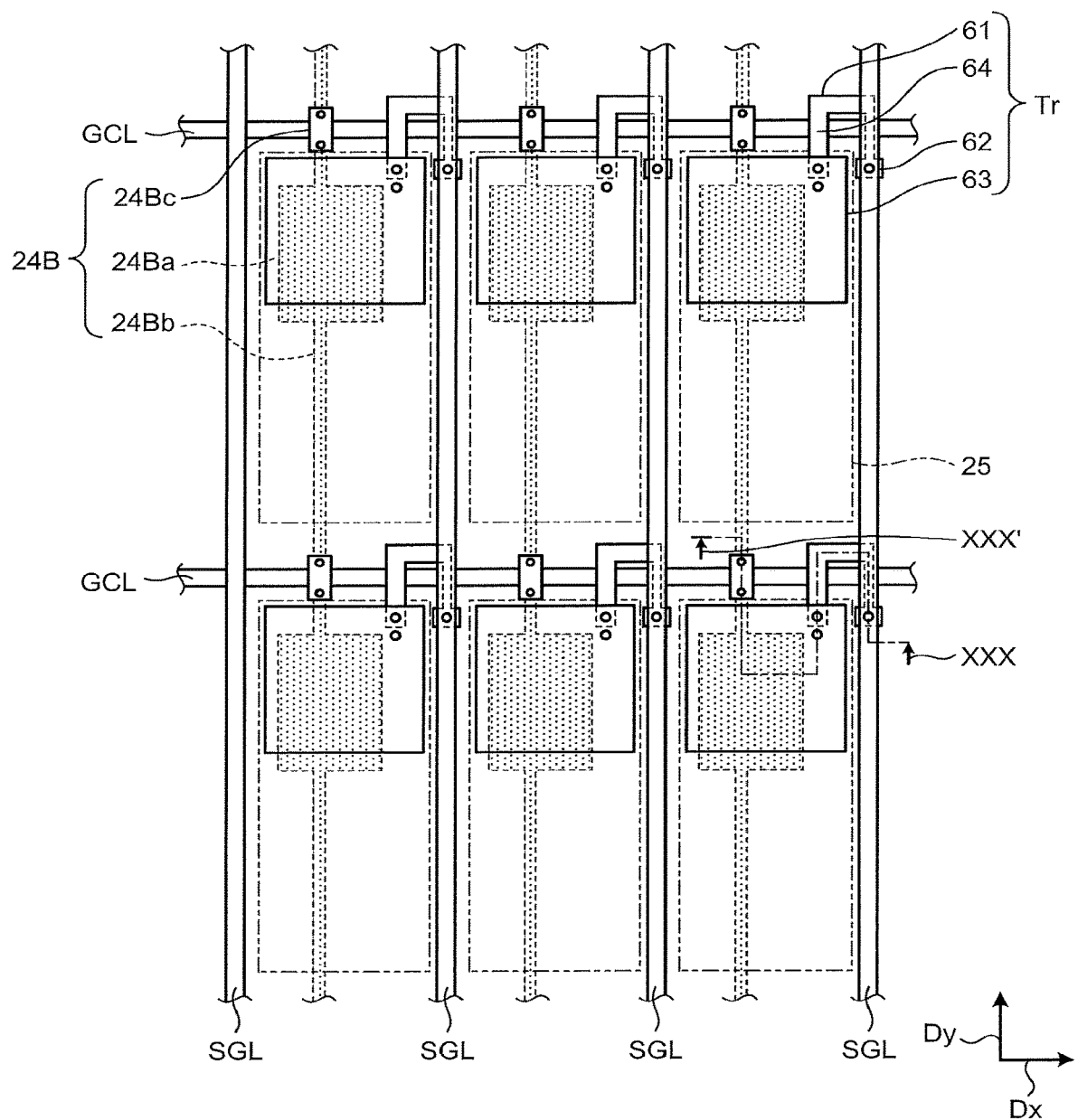
FIG. 29 is a plan view illustrating a pixel configuration of the display device according to the third embodiment.
Figure 30:
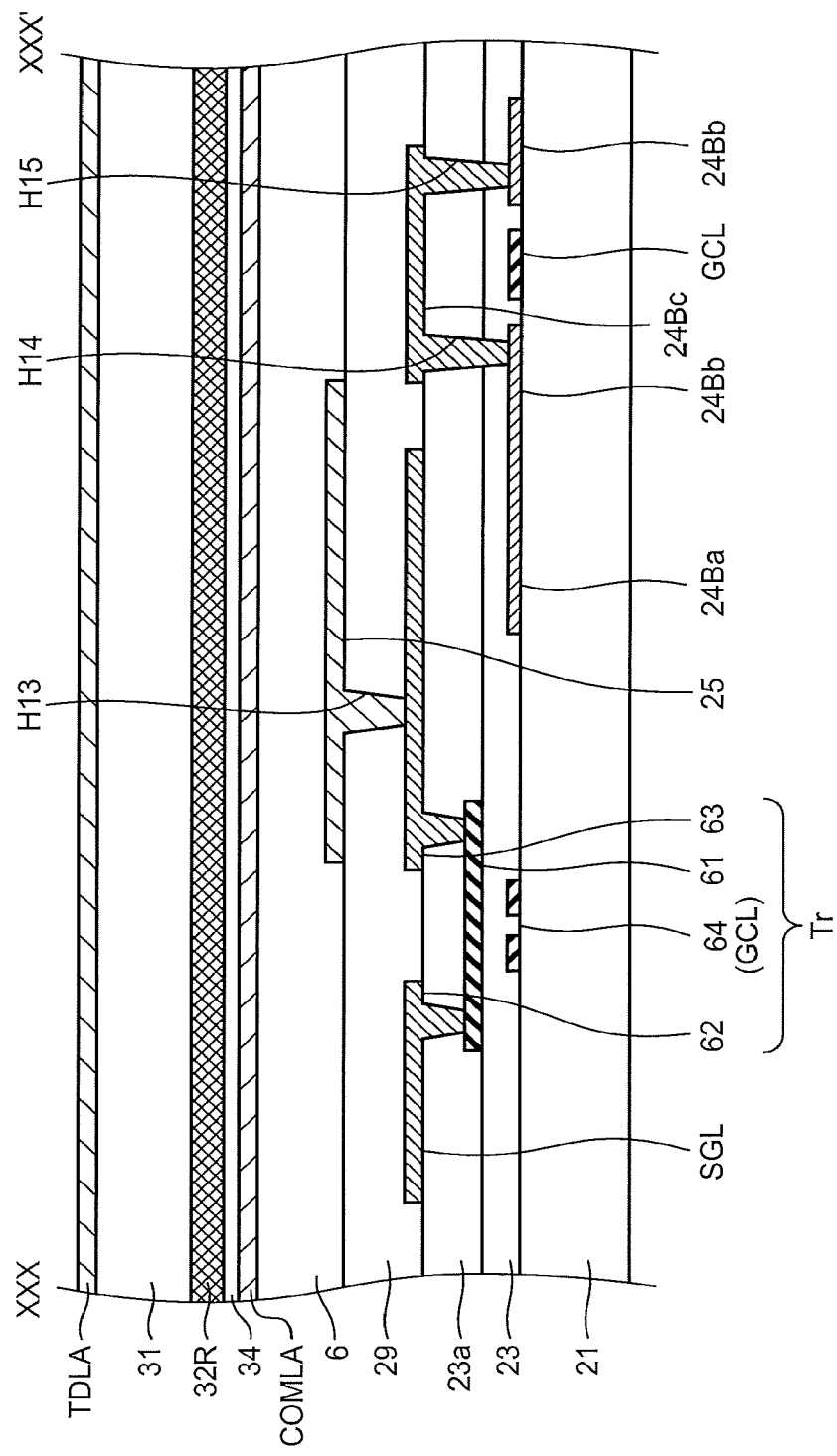
FIG. 30 is a sectional view along line XXX-XXX' in FIG. 29.

FIG. 29 is a plan view illustrating a pixel configuration of the display device according to the third embodiment. FIG. 30 is a sectional view along line XXX-XXX' in FIG. 29. For ease of viewing, FIG. 29 illustrates the pixel electrodes 25 with long dashed double-short dashed lines. As illustrated in FIG. 29, the gate lines GCL and the signal lines SGL are provided so as to intersect with each other in the plan view. The gate lines GCL and the signal lines SGL partition the display region Ad into a matrix having a row-column configuration. Each of the partitioned regions is referred to as a pixel (sub-pixel) region.

Each of the pixel regions includes the switching element Tr and the pixel electrode 25. As illustrated in FIG. 30, the pixel electrode 25 is coupled to the drain electrode 63 of the switching element Tr through a contact hole H13.

As illustrated in FIG. 29, each of the second electrodes 24B includes a capacitive electrode 24Ba, wiring 24Bb, and a bridge 24Bc. Each of the capacitive electrodes 24Ba is provided in the corresponding pixel region, and overlaps with the corresponding pixel electrode 25 and the corresponding drain electrode 63. The wiring 24Bb and the bridge 24Bc couple the capacitive electrodes 24Ba adjacent in the second direction Dy to each other. The bridge 24Bc is provided across in the width direction (second direction Dy) of each of the gate lines GCL. As a result, the bridge 24Bc couples together the capacitive electrode 24Ba and the wiring 24Bb arranged in the second direction Dy across the gate line GCL. The second electrodes 24B are provided, as a whole, along the signal lines SGL, and intersect with the gate lines GCL, in the plan view.

As illustrated in FIG. 30, each of the capacitive electrodes 24Ba and the wiring 24Bb are provided in the same layer as that of the gate line GCL. The capacitive electrode 24Ba and the wiring 24Bb are provided on one side of the gate line GCL, and the wiring 24Bb is provided on the other side thereof. The bridge 24Bc is provided above the capacitive electrode 24Ba and the wiring 24Bb with insulating layers 23 and 23a interposed therebetween. The bridge 24Bc is provided in the same layer as that of the signal lines SGL. One end of the bridge 24Bc is coupled to the wiring 24Bb on one side of the gate line GCL through a contact hole H14. The other end of the bridge 24Bc is coupled to the wiring 24Bb on the other side of the gate line GCL through a contact hole H15. With the configuration described above, the second electrodes 24B are provided so as to intersect with the gate lines GCL in the plan view while being electrically isolated from the gate lines GCL.

Figure 31:
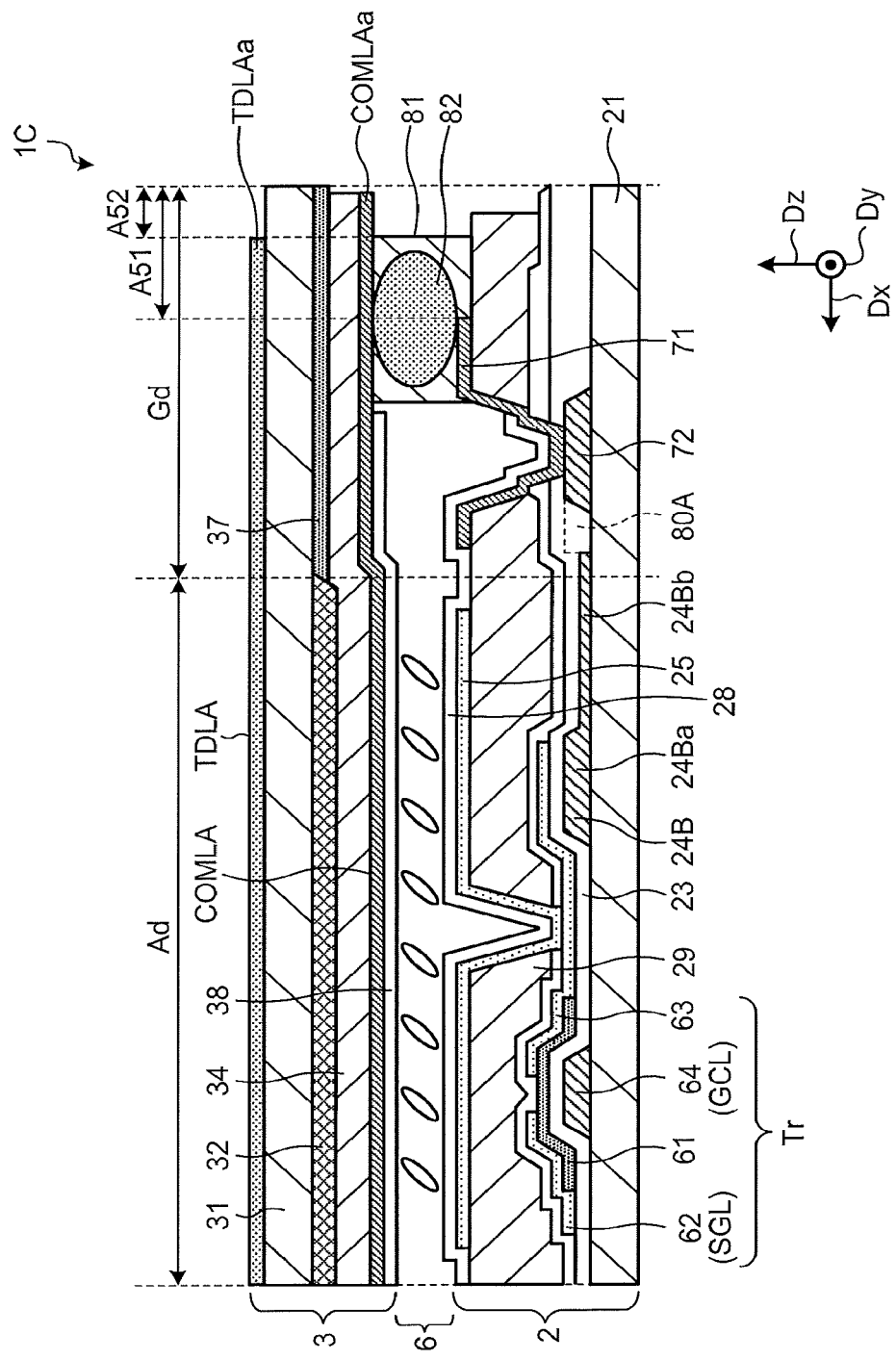
FIG. 31 is a schematic sectional diagram for explaining a coupling configuration between common electrodes and second electrodes according to the third embodiment.
Figure 32:
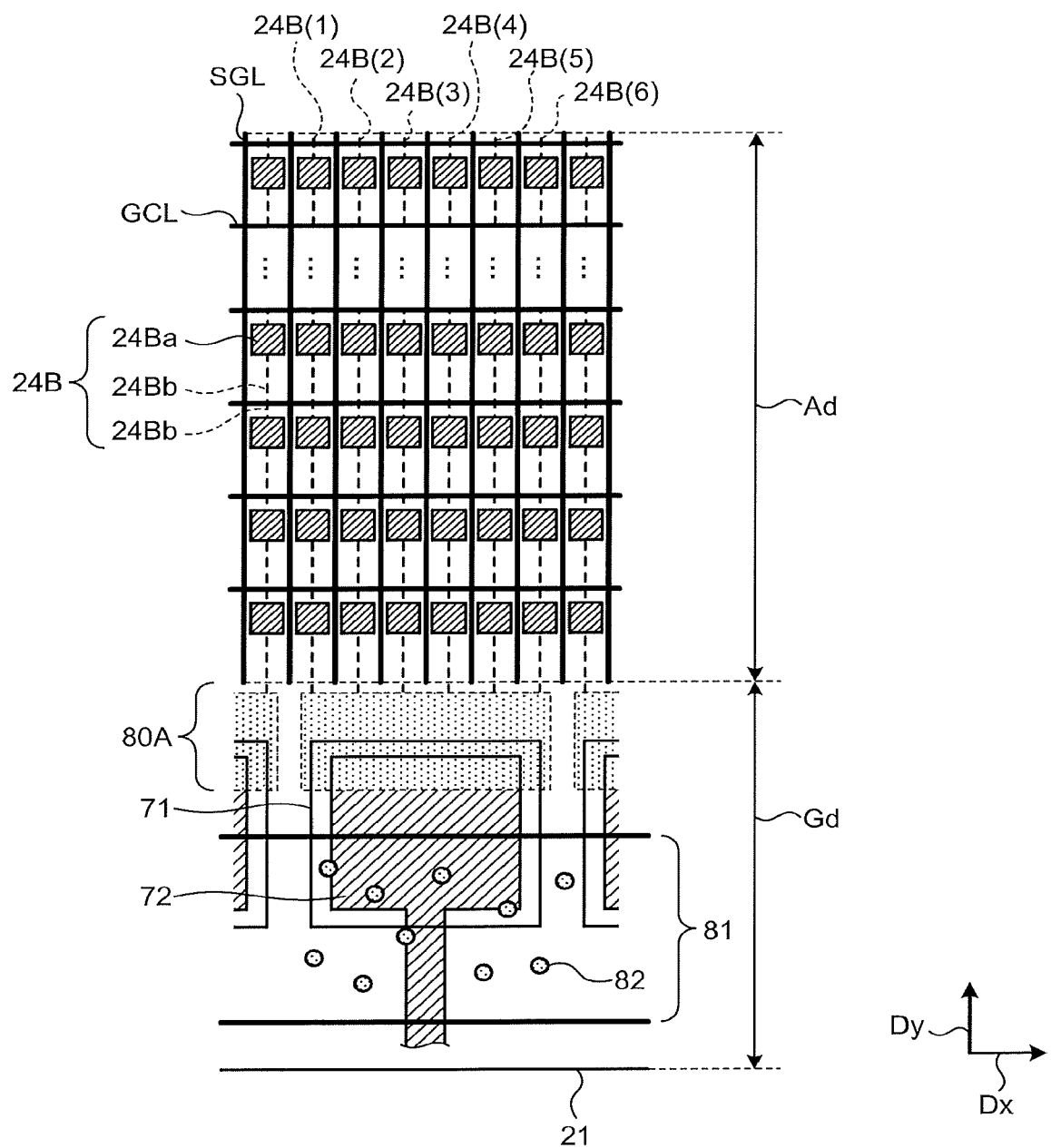
FIG. 32 is a plan view schematically illustrating the second electrodes and the conductive portion.
Figure 33:
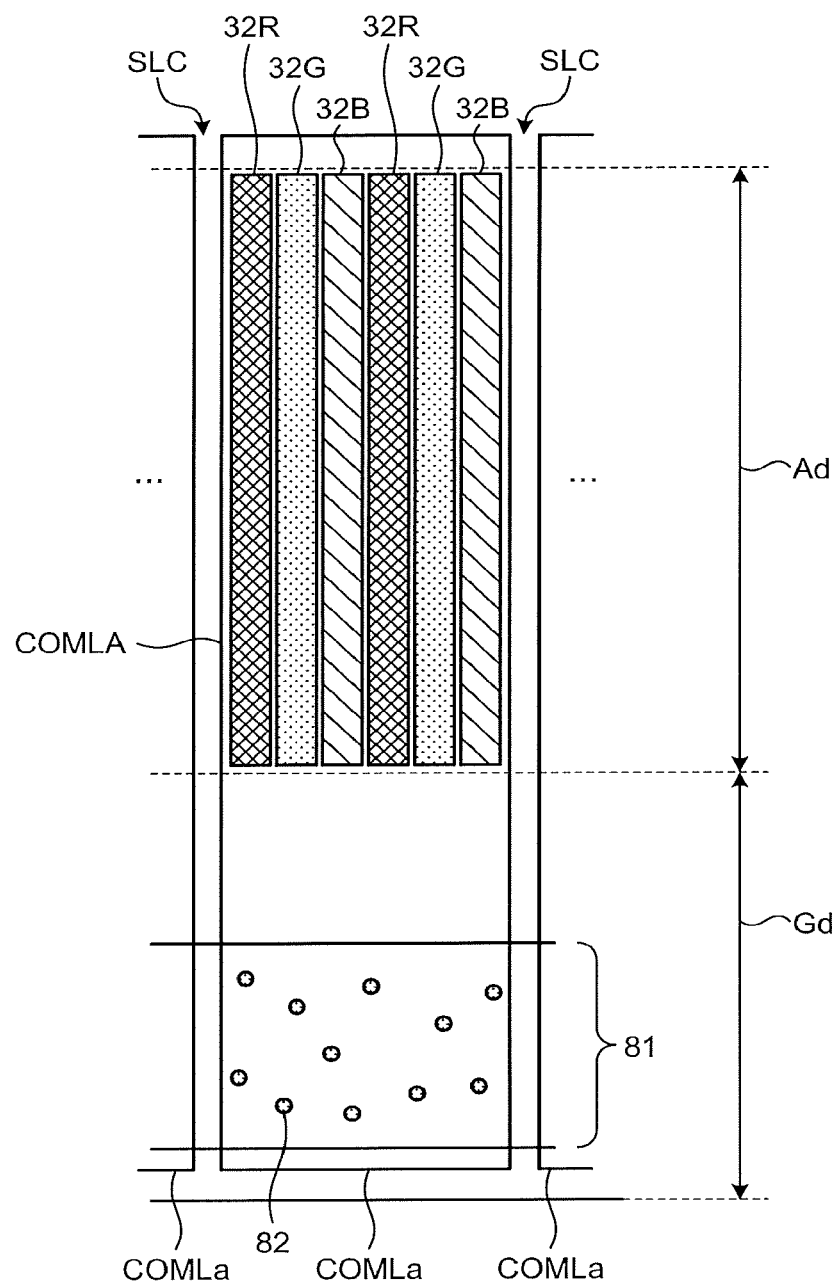
FIG. 33 is a plan view schematically illustrating the common electrodes and the conductive portion.

The following describes a coupling configuration between the second electrodes 24B and the common electrodes COMLA. FIG. 31 is a schematic sectional diagram for explaining the coupling configuration between the common electrodes and the second electrodes according to the third embodiment. FIG. 32 is a plan view schematically illustrating the second electrodes and the conductive portion. FIG. 33 is a plan view schematically illustrating the common electrodes and the conductive portion.

As illustrated in FIG. 31, the common electrode COMLA is coupled to the second electrode 24B through coupling portion COMLAa, the conductive portion 81, the conductive layer 71, and the coupling electrode 72. FIG. 31 illustrates only the capacitive electrode 24Ba and the wiring 24Bb, not illustrating the bridge 24Bc. The configuration of the conductive portion 81 and other parts illustrated in FIG. 31 is the same as that of the first embodiment illustrated in FIG. 16. The display device 1C of the present embodiment differs from the display device 1 of the first embodiment in the longitudinal direction (second direction Dy) and the arrangement direction (first direction Dx) of the common electrodes COMLA, as illustrated in FIG. 25. Therefore, in the present embodiment, the conductive portion 81 is provided on sides of the first substrate 21 and the second substrate 31 along the first direction Dx among the sides thereof.

As illustrated in FIGS. 32 and 33, the second electrodes 24B have a longitudinal direction in the same direction as that of the common electrodes COMLA. The coupling electrodes 72 are provided corresponding to the common electrodes COMLA arranged in the first direction Dx. That is, the coupling electrodes 72 are coupled in a one-to-one relation to the common electrodes COMLA through the conductive portion 81. As illustrated in FIG. 33, the color regions 32R, 32G, and 32B of the color filter 32 are provided along the common electrodes COMLA in the plan view.

As illustrated in FIGS. 32 and 33, one common electrode COMLA overlaps with six second electrodes 24B(1), 24B(2), 24B(3), 24B(4), 24B(5), and 24B(6). The second electrodes 24B(1) to 24B(6) are coupled to one coupling electrode 72 through a switching circuit 80A. In the same manner, the signal lines SGL overlapping with one common electrode COMLA are also coupled to one of the coupling electrodes 72 through the switching circuit 80A.

In this manner, a plurality of the second electrodes 24B and a plurality of the signal lines SGL are electrically coupled to one common electrode COMLA through the switching circuit 80A, the coupling electrode 72, and other components. The switching circuit 80A is a switching circuit including the various switches and the various kinds of wiring illustrated in FIGS. 26 to 28. Operation of the switching circuit 80A switches the coupling state of the signal lines SGL to the common electrodes COMLA for each of the display period Pd, the first sensing period Pem, and the second sensing period Pes.

In the present embodiment, during the first sensing period Pem, in addition to the common electrodes COMLA, the signal lines SGL and the second electrodes 24B also serve as the transmitting coils CTx. During the second sensing period Pes, in addition to the common electrodes COMLA, the signal lines SGL and the second electrodes 24B also serve as the drive electrodes. As a result, the detection sensitivity can be improved in the electromagnetic induction method and the mutual-capacitance method.

Pattern Configuration Example of Common Electrodes

Figure 34:
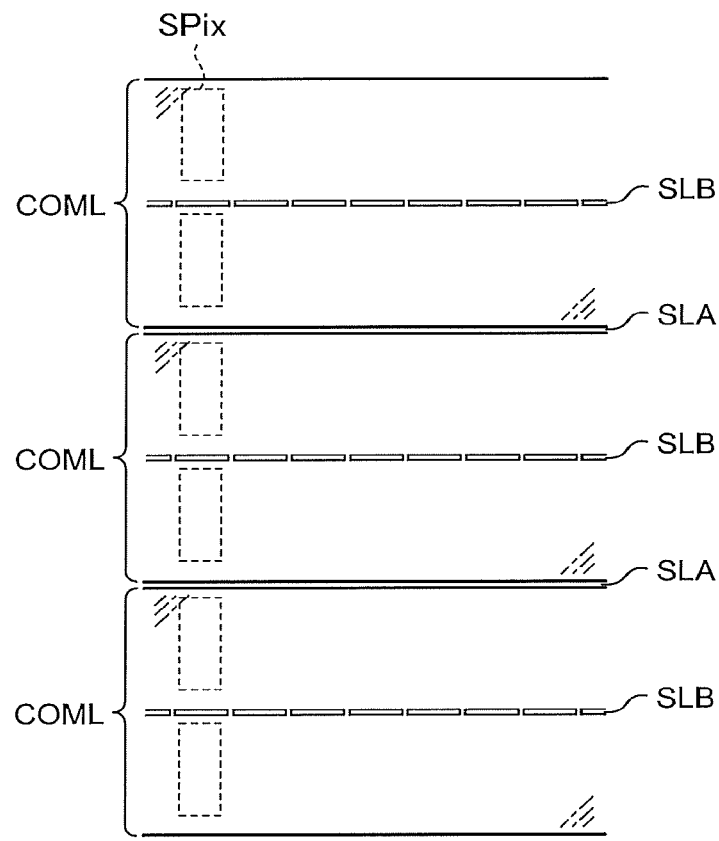
FIG. 34 is a plan view illustrating a pattern configuration example of the common electrodes.
Figure 35:
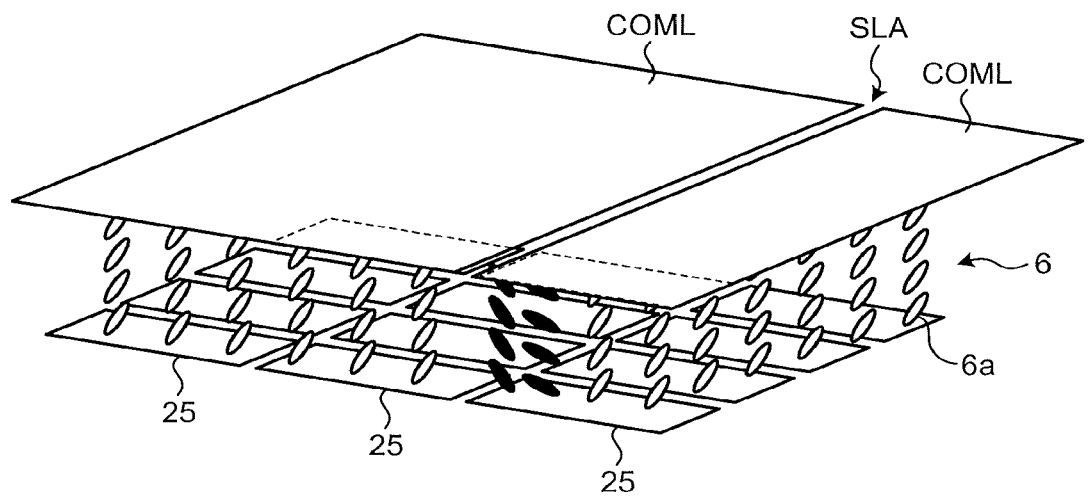
FIG. 35 is an explanatory diagram for explaining a relation between the common electrodes and orientations of liquid crystals.

FIG. 34 is a plan view illustrating a pattern configuration example of the common electrodes. FIG. 35 is an explanatory diagram for explaining a relation between the common electrodes and orientations of the liquid crystals. FIG. 35 schematically illustrates the pixel electrodes 25, the common electrodes COML, and the liquid crystal layer 6 disposed between the pixel electrodes 25 and the common electrodes COML. In the liquid crystal layer 6, ellipses indicate liquid crystal molecules 6a, and schematically illustrate orientation states of the liquid crystal molecules 6a.

As illustrated in FIG. 35, slits SLA are provided between the adjacent the common electrodes COML. The state of electric fields between the pixel electrodes 25 and the common electrodes COML in the regions not provided with the slits SLA differ from that in regions provided with the slits SLA. As a result, the orientation of the liquid crystal molecules 6a in the regions provided with the slits SLA may differ from the orientation in other regions and cause lines to be displayed.

FIG. 34 illustrates three of the common electrodes COML isolated by the slits SLA. Each of the common electrodes COML is provided so as to overlap with adjacent two of the sub-pixels SPix. A plurality of slits SLB are arranged in each of the common electrodes COML in a direction parallel to the slits SLA. Each of the slits SLB is provided between the adjacent sub-pixels SPix in the plan view. The slits SLA and the slits SLB are provided so as to overlap with the gate lines GCL (refer to FIG. 29). The widths of the slits SLA and the slits SLB are greater than the width of the gate lines GCL. This configuration reduces capacitance between the gate lines GCL and the common electrodes COML.

The common electrodes COML are not limited to the example illustrated in FIG. 34, and may each have a width overlapping with three or more of the sub-pixels SPix depending on the resolution of the touch detection. In this case, the slits SLB are arranged in the direction parallel to the slits SLA, and are also arranged in a direction intersecting with the slits SLA. The common electrodes COML are not limited to the example illustrated in FIG. 34, and may be coupled in the peripheral region Gd, instead of being coupled in the display region Ad.

The slits SLA and the slits SLB are provided on a pixel line-by-pixel line basis. This configuration can allow the liquid crystal orientation state of regions provided with the slits SLB to be closer to the liquid crystal orientation state of the regions provided with the slits SLA. As a result, even if the displayed lines appear in the regions provided with the slits SLA, the visibility of the lines decreases.

In accordance with the pattern of the common electrodes COML provided with the slits SLA and SLB on a pixel line-by-pixel line basis as described above, a column inversion driving system or a frame inversion driving system is preferably employed as a display driving system; that is, a pixel writing system of the display device 1. That is, since these driving systems can reduce disarray in liquid crystal orientation at the slit portions, the display quality can be improved.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure naturally belong to the technical scope of the present disclosure.

What is claimed is:

1. A display device comprising:
a substrate;
a plurality of pixel electrodes;
a display functional layer;
a plurality of common electrodes;
a plurality of first electrodes; and
a controller configured to control the pixel electrodes, the common electrodes, and the first electrodes,
wherein the substrate, the pixel electrodes, the display functional layer, the common electrodes, and the first electrodes are stacked in the order as listed, and the common electrodes and the first electrodes are provided so as to intersect with each other in a plan view,
wherein the controller is configured to
perform processing during a plurality of display periods to display an image, during a first sensing period, and during a second sensing period in a time-division manner, and
control the pixel electrodes, the common electrodes, and the first electrodes according to the display periods, the first sensing period, and the second sensing period,
wherein, during the display periods, in response to a control signal from the controller, the pixel electrodes are supplied with a pixel signal, and the common electrodes are supplied with a common signal,
wherein, during the first sensing period, in response to the control signal from the controller, the common electrodes are supplied with a first drive signal to generate a magnetic field, and an electromotive force caused by the magnetic field is generated in the first electrodes, and
wherein, during the second sensing period, in response to the control signal from the controller, the common electrodes are supplied with a second chive signal to generate electrostatic capacitance between the common electrodes and the first electrodes.

2. The display device according to claim 1,
wherein a switch is provided that is configured to couple together ends on the same side of a pair of the common electrodes, and
wherein the controller is configured to
couple the pair of common electrodes to each other by operating the switch during the first sensing period, and
uncouple the pair of the common electrodes from each other by operating the switch during a period different from the first sensing period.

3. The display device according to claim 1, further comprising:
a first voltage supply configured to supply a first voltage to the common electrodes; and
a second voltage supply configured to supply a second voltage lower than the first voltage to the common electrodes,
wherein, during the first sensing period, in response to the control signal from the controller,
the first voltage supply is coupled to one end of at least one of the common electrodes,
the second voltage supply is coupled to the other end of the at least one of the common electrodes,
the second voltage supply is coupled to one end of another common electrode, and
the first voltage supply is coupled to the other end of the other common electrode.

4. The display device according to claim 1, further comprising an analog front-end circuit coupled to the first electrodes.

5. The display device according to claim 4, further comprising a switching circuit provided between the first electrodes and the analog front-end circuit and configured to switch a coupling state between the first electrodes and the analog front-end circuit,
wherein the switching circuit is configured to:
couple together first ends on the same side of at least one pair of the first electrodes, and couple a second end of one of the pair of the first electrodes to the analog front-end circuit during the first sensing period, and
couple the first electrodes to the analog front-end circuit during the second sensing period.

6. The display device according to claim 5, further comprising a plurality of second electrodes between the substrate and the pixel electrodes,
wherein a longitudinal direction of the second electrodes is the same direction as that of the common electrodes in the plan view.

7. The display device according to claim 6, further comprising a plurality of lines provided between the substrate and the display functional layer, the lines being arranged from one side to the other side of the substrate,
wherein the common electrodes and the second electrodes are provided so as to intersect with the lines in the plan view.

8. The display device according to claim 7,
wherein the lines are covered with a planarizing film, and
wherein the second electrodes are provided on a surface of the planarizing film.

9. The display device according to claim 8,
wherein the second electrodes include a metal layer and a light-transmitting conductive layer covering the metal layer.

10. The display device according to claim 8,
wherein the pixel electrodes are reflective electrodes, and
wherein the second electrodes are provided in positions overlapping with the reflective electrodes.

11. The display device according to claim 6, further comprising a plurality of lines provided between the substrate and the display functional layer, the lines being arranged from one side to the other side of the substrate,
wherein the common electrodes and the second electrodes are provided along the lines.

12. The display device according to claim 6,
wherein, in response to the control signal from the controller, the second electrodes are supplied with the same signal as that supplied to the common electrodes during the display periods, the first sensing period, and the second sensing period.

13. The display device according to claim 12,
wherein, in response to the control signal from the controller,
the second electrodes are supplied, during the display periods, with the same potential signal as that supplied to the common electrodes,
the second electrodes opposed to the common electrodes supplied with the first drive signal are supplied, during the first sensing period, with the same potential signal as the first drive signal, and
the second electrodes opposed to the common electrodes supplied with the second drive signal are supplied, during the second sensing period, with the same potential signal as the second drive signal.

14. The display device according to claim 1, further comprising a plurality of second electrodes between the substrate and the pixel electrodes,
  wherein a longitudinal direction of the second electrodes is the same direction as that of the common electrodes in the plan view.

15. The display device according to claim 14, further comprising a plurality of lines provided between the substrate and the display functional layer, the lines being arranged from one side to the other side of the substrate,
  wherein the common electrodes and the second electrodes are provided so as to intersect with the lines in the plan view.

16. The display device according to claim 15,
  wherein the lines are covered with a planarizing film, and the second electrodes are provided on a surface of the planarizing film.

17. The display device according to claim 16,
  wherein the pixel electrodes are provided as reflective electrodes, and
  wherein the second electrodes are provided in positions overlapping with the reflective electrodes.

18. The display device according to claim 14, further comprising a plurality of lines provided between the substrate and the display functional layer, the lines being arranged from one side to the other side of the substrate,
  wherein the common electrodes and the second electrodes are provided along the lines.

19. The display device according to claim 14,
  wherein, in response to the control signal from the controller, the second electrodes are supplied with the same signal as that supplied to the common electrodes during the display periods, the first sensing period, and the second sensing period.

20. The display device according to claim 19,
  wherein, in response to the control signal from the controller,
    the second electrodes are supplied, during the display periods, with the same potential signal as that supplied to the common electrodes,
    the second electrodes opposed to the common electrodes supplied with the first drive signal are supplied, during the first sensing period, with the same potential signal as the first drive signal, and
    the second electrodes opposed to the common electrodes supplied with the second drive signal are supplied, during the second sensing period, with the same potential signal as the second drive signal.

* * * * *